United States Patent [19]

Dunn et al.

[11] Patent Number: 4,911,217

[45] Date of Patent: Mar. 27, 1990

[54] INTEGRATED CIRCUIT TRANSPONDER IN A PNEUMATIC TIRE FOR TIRE IDENTIFICATION

[75] Inventors: William F. Dunn, Stow; Robert W. Brown, Medina, both of Ohio

[73] Assignee: The Goodyear Tire & Rubber Company, Akron, Ohio

[21] Appl. No.: 328,428

[22] Filed: Mar. 24, 1989

[51] Int. Cl.[4] .......................... B60C 9/00; H04Q 1/48
[52] U.S. Cl. ............................... 152/152.1; 152/526; 152/539; 152/548; 340/825.54; 340/825.72; 342/44
[58] Field of Search ................ 152/152.1, 450, 523, 152/539, 538; 340/825.54, 825.72; 342/44; 375/88, 45, 62

[56] References Cited

U.S. PATENT DOCUMENTS

| | | | |
|---|---|---|---|
| 2,920,674 | 1/1960 | Bull | 152/542 |
| 3,160,865 | 12/1964 | Tourtellotte | 340/174.1 |
| 3,179,929 | 4/1965 | Tourtellotte | 340/174.1 |
| 3,225,810 | 12/1965 | Enabnit | 152/523 X |
| 3,460,119 | 8/1969 | Ugo et al. | 340/174.1 |
| 4,730,188 | 3/1988 | Milheiser | 340/825.72 X |
| 4,805,009 | 2/1989 | Pryor et al. | 357/70 |
| 4,827,395 | 5/1989 | Anders et al. | 340/825.72 X |

Primary Examiner—Raymond Hoch
Attorney, Agent, or Firm—L. R. Drayer

[57] ABSTRACT

A combination pneumatic tire and integrated circuit transponder for tire identification. The transponder is located within the tire structure and is capable of transmitting an identifying digital signal in response to interrogation by an R/F electric field emanating from outside the tire. The transponder then transmits the identifying signal, which is received, conditioned and demodulated. The tire has a steel-reinforced component, such as an annular tensile member in its bead or a steel-reinforced ply. The transponder has first and second electrodes, the first of which is positioned such that the average spacing of this first electrode's surface from one of the steel-reinforced tire components is substantially less than the average spacing of the second electrode's surface from such component. The transponder is capable of transmitting the electrical signal from the tire both prior to and after its valcanization, thus permitting identification and control of the tire during its manufacture and after its distribution and use.

25 Claims, 20 Drawing Sheets

INTEGRATED CIRCUIT TRANSPONDER IN A PNEUMATIC TIRE FOR TIRE IDENTIFICATION

BACKGROUND OF THE INVENTION

This invention relates to electronic identification of a pneumatic tire both during its manufacture and thereafter. More particularly, the invention relates to the combination of a pneumatic tire and an integrated circuit transponder located within the structure of the tire. The integrated circuit transponder is a passive device in that it has no source of electrical energy but instead depends upon the receipt of an "interrogation" signal emanating from a source outside of the tire. The interrogation signal is rectified by the integrated circuit transponder, which then utilizes the rectified signal as a source of electrical energy for use in its transmission of an electrical signal digitally encoded to identify the tire. A unique code can be used for each tire.

An "Identification System" is described in U.S. Pat. No. 4,730,188 issued Mar. 8, 1988, to Thomas A. Milheiser and assigned to Identification Devices, Inc. of Boulder, Colo. now known as Destron/IDI, Inc. of Boulder, Colo. The Milheiser patent describes a system which utilizes circuitry similar in many ways to prior-art circuitry described herein, the description herein being of an integrated circuit marketed by Destron/IDI. However, the circuitry described in the Milheiser patent is regarded by the inventors as being less desirable than the integrated circuit described herein and now sold by Destron/IDI.

The Milheiser patent describes a device called an "exciter" that is used to transmit the interrogation signal to the circuitry in the transponder used to identify an animal or article with which the transponder is associated for identification. The exciter consists of an A/C or oscillating radio frequency (R/F) signal source and power driver which provides a high current, high voltage excitation signal to an interrogator coil. The magnetic field propagated by the interrogator coil couples inductively to a very small coil associated with the circuitry of the transponder, thereby, inductively supplying A/C energy to the transponder circuitry.

One of the present inventors conceived the use of the inductively coupled R/F transponders manufactured by Identification Devices, Inc. in pneumatic tires prior to May, 1986, when such transponders were first built into passenger tires at facilities of Goodyear, the assignee of this invention, for evaluation. While such inductively-coupled transponders worked reasonably well in the passenger tire application, the development and product costs lead to reduced interest in the passenger tire application.

Interest in the use of the inductively-coupled transponder for radial-ply, all steel truck tires has continued, and Destron/IDI has installed inductively coupled transponders to the radially inner side of the innerliner in such pneumatic truck tires. The devices typically have been utilized with flat inductive coils, connected to an integrated circuit in the transponder. The flat coils and integrated circuit were embedded in a plastic material about the size and shape of a credit card. The "credit card" device then was inserted within the inside of an already cured pneumatic tire by adhering the device to the innerliner of the tire with a patch material. This identification technique requires special materials surrounding the "credit card" device, can only be used after tire vulcanization, and is expensive to implement. Moreover, the inductively-coupled exciter device used to interrogate the "credit card" integrated circuit transponder had to be located closer to the tire than is desirable.

It has been known by Destron/IDI and the present inventors that electric field or capacitive coupling of an A/C electric field into a transponder device is possible. This requires very strong electric fields in order to excite the transponder when the transponder is located in free space.

The inventors have discovered that a transponder which has separate first and second electrodes, rather than an inductive coil, for receipt of energy supplied by the oscillating electric field from the exciter can be used for a transponder positioned within a tire provided the transponder has its electrodes suitably designed and positioned within the tire structure with respect to its steel components. This capacitive coupling to the transponder can even be accomplished in a steel-reinforced radial ply truck tire in which the steel carcass ply forms an equipotential surface. Accordingly, the inventors have provided a combination tire and integrated circuit transponder which can withstand the severe environmental conditions a tire must endure during its manufacture and use and which can be used in automation of manufacturing, tracking of tires during and after manufacture, sorting, inventory control, shipping of the tire, statistical process control, field engineering, anti-theft, and control of truck tire retreading, and vehicle or trailer tire application or identification.

SUMMARY OF THE INVENTION

The invention provides, in combination, a pneumatic tire and an integrated circuit transponder located within the structure of the tire. The pneumatic tire has spaced beads including annular tensile members of wound or cabled steel wire. The tire has a plurality of plies at least one of which is a continuous ply extending between the annular tensile members and having its ends turned axially (or both radially and axially) and radially outwardly about the annular tensile members.

The transponder in the combination has first and second electrodes and is able to transmit an electrical signal after an oscillating electric field of sufficient intensity is applied between its first and second electrodes. The average spacing of the surface of the first electrode of the transponder from steel in a component of the tire, which component is selected from the group consisting of the plies and the annular tensile members, is substantially less than the average spacing of the surface of the second electrode of the transponder from the steel wire in such component ply or annular tensile member. The transponder within the tire structure is capable of transmitting the electrical signal in response to an oscillating electric field emanating from a source spaced from the tire and located radially (or both radially and axially) away from the tread surface. Moreover, the transponder is capable of transmitting the electrical signal from the tire both prior to and after the tire's vulcanization. This results from the transponder being positioned within the tire structure at an early point in its manufacturing process.

In order for a transponder device to be satisfactory in the pneumatic tire combination described above, it must be compatible with the tire in that, as a "foreign material in the tire" it must not cause separations within this laminated structure. Its size must be small and it should be placed in the tire as its components are being added at the building machine and prior to its vulcanization. The transponder must be durable in that within the tire it must be able to withstand normal during temperatures, compression in the mold and the resulting stresses and strains and shaping of the tire carcass. Also, it must continue to be operable throughout the tire's life, which for a truck tire is approximately seven years. Furthermore, the device should be able to survive normal use of the tire, which is subjected to shock, flexing, stress, strain, centrifugal forces, heat, cold, mounting and dismounting, retreading, etc. Moreover, the system used to interrogate the transponder must be inexpensive and portable, readings should be fast, and the transponder should be readable while the tire is in a tire stack or on a dual wheel of a vehicle.

The invention described briefly above and detailed below is expected to satisfy the mentioned requirements for a tire identification system as may be better understood by reference to the following specification and drawings in which.

Figure 1:
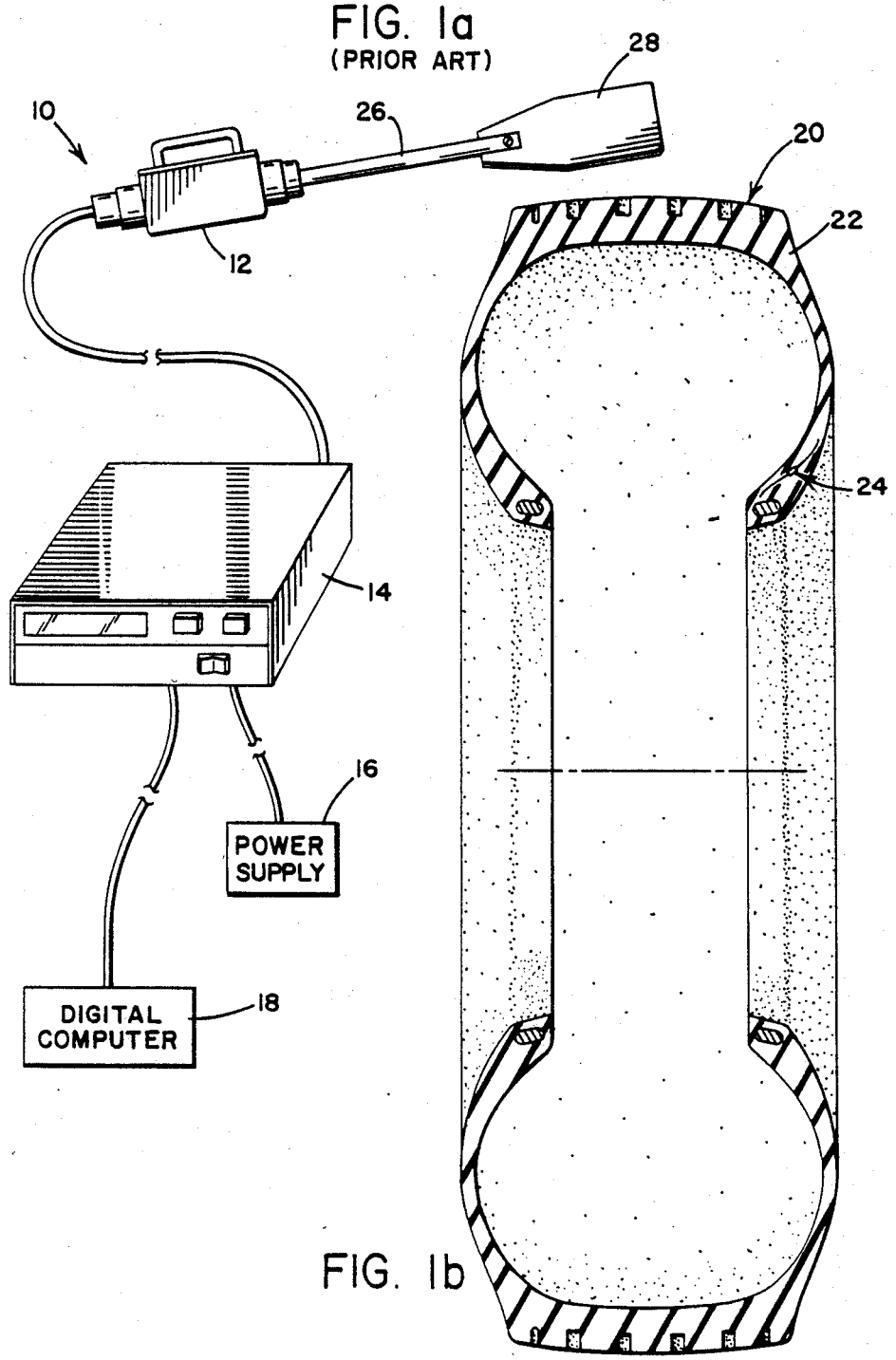
FIG. 1b is a sectional view of a pneumatic tire and transponder according to the invention and FIG. 1a is a schematic illustration of a prior-art tire identification system that can be used to identify the combination tire and transponder.

To facilitate understanding of the invention and claims, the following definitions related to pneumatic tires are provided:

"Axial" and "axially" are used herein to refer to lines or directions that are parallel to the axis of rotation of the tire.

"Bead" means that part of the tire comprising an annular tensile member wrapped by ply cords and shaped, with or without other reinforcement elements such as flippers, chippers, apexes, toeguards and chafers, to fit the design rim for the tire.

"Belt" means a ply of parallel cords, woven or unwoven, underlying the tread, unanchored to the bead, and having a cord angle either left or right, in the range from 17° to 27° with respect to the equatorial plane of the tire.

"Breaker" is a word more genetic than belt and includes unanchored plies underlying the tread having cord angles with respect to the equatorial plane forming angles, either left or right, up to 90° with respect to the equatorial plane of the tire.

"Carcass" means the tire structure apart from the belt or breaker structure, tread, undertread, and sidewall rubber over the plies, but including the beads.

"Cord" means one of the reinforcement strands of which the plies in the tire are comprised.

"Cord angle" means the acute angle, either left or right, in a plan view of the tire, formed by a cord with respect to the equatorial plane.

"Equatorial plane" (EP) means the plane perpendicular to the tire's access of rotation and passing through the center of its tread.

"Inner" means toward the inside of the tire, and "outer" means toward its exterior.

"Innerliner" means the layer or layers of the elastomer or other material that forms the inside surface of a tubeless tire and that contains the inflating fluid within the tire.

"Ply" unless otherwise specified means a continuous layer of rubber-coated parallel cords.

"Pneumatic tire" means a laminated mechanical device of generally toroidal shape (usually an open torus) having beads and a tread and made of rubber, chemicals, fabric and steel, or other materials. When mounted on the wheel on a motor vehicle, the tire through its tread, provides traction and contains the fluid that sustains the vehicle load.

"Radial" and "radially" are used to mean directions radially toward or away from the axis of rotation of the tire.

"Radial-ply tire" means a belted or circumferentially restricted pneumatic tire in which the ply cords which extend from bead to bead are laid at cord angles between 65° and 90° with respect to the equatorial plane of the tire.

"Tread" means a molded rubber component which when bonded to a tire casing includes that portion of the tire that comes into contact with the road when the tire is normally inflated and under normal load.

Reference now is made to the drawings, wherein like numerals or identification refer to like parts in the several figures.

In FIG. 1a, there is shown a system 10 suitable for use in identification of a combination tire 22 and passive integrated circuit transponder 24, together generally identified by the numeral 20 in FIG. 1b. The interrogating tire identification system 10 is known in the prior art, preferably is a system commercially available from Destron/IDI, Inc. and includes a portable, hand-held module 12 having within it an exciter and signal conditioner electrical circuit.

The exciter and signal conditioner unit 12 is connected electrically to a demodulator and display unit 14 for indicating on its face the numerical identification of the tire/transponder 20 in response to an interrogation signal transmitted by the exciter and signal conditioner unit 12. A power supply 16 may be separate from or incorporated into the unit 14 and an optional digital computer 18 may be used to display, print, or otherwise utilize the identification data obtained in the unit 14.

The hand-held unit 12 has a wand 26 which preferably is an insulated electrical conductor that is quite rigid and that electrically conducts an oscillatory or A/C voltage to a conductive plate 28. The plate 28 has a coating of plastic over it to protect the user of the device from electric shock; this plastic has dielectric characteristics that will not cause undue voltage drop across the plastic material. The plate 28 comprises a source of electric field oscillating at 400 kHz, which field is directional and emanates from or toward the earth or ground reference applicable to units 14 and/or 16.

The system 10 is very similar in design to that described in aforementioned U.S. Pat. No. 4,730,188 of Milheiser, but the Milheiser device described in such patent employs an interrogator coil for inductively coupling 400 kHz energy into a transponder having an inductive or coil antenna. The system 10 has the oscillating electric-field source plate 28 for capacitive coupling to the transponder 24, rather than having a magnetic or an inductive coupling system. This has substantial advantages over the inductive coupling system, but the design of the transponder 24 must be modified considerably and it must be located within the tire 22 in accordance with the teachings of this invention in order to secure improved tire identification.

Figure 2:
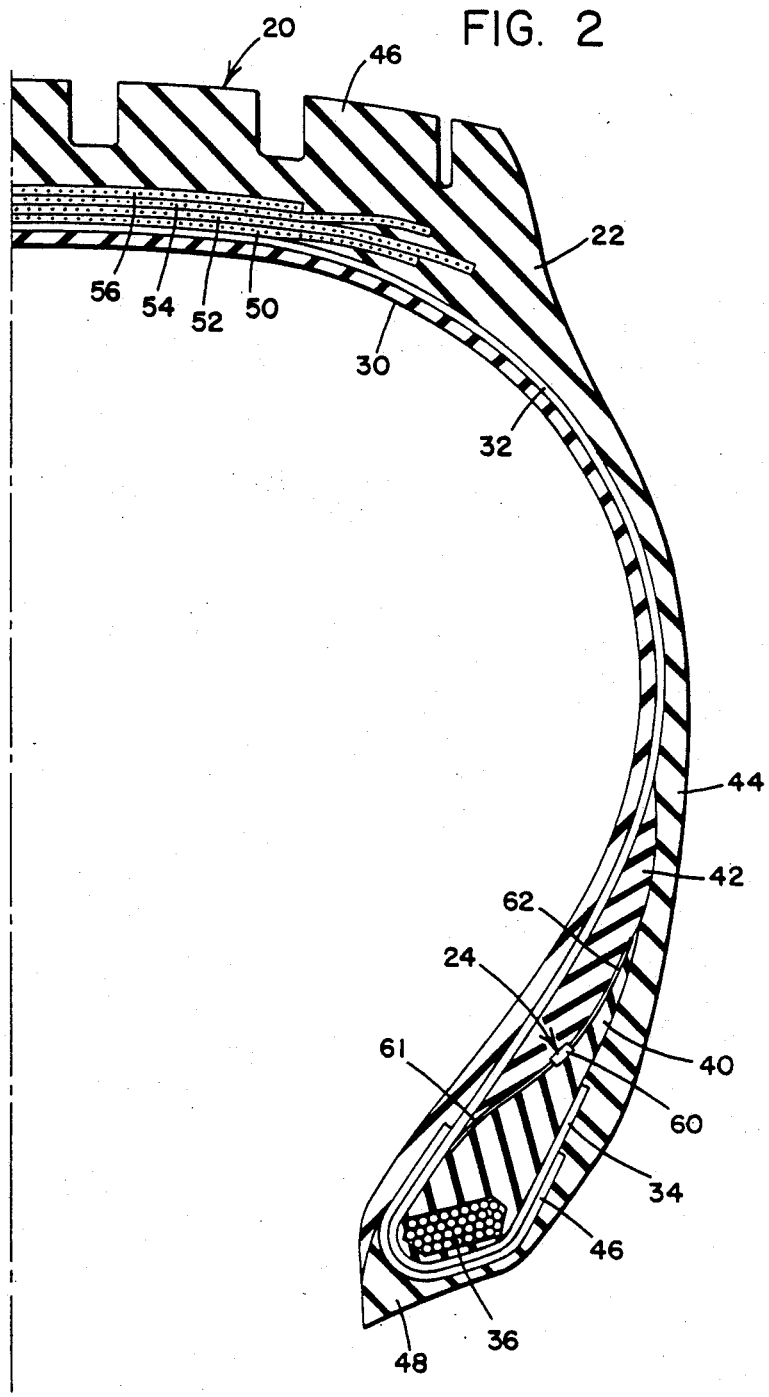
FIG. 2 is a half-sectional view of a radial-ply, steel-reinforced pneumatic truck tire having an integrated circuit transponder located within it.

The tire and integrated circuit transponder 20 of FIG. 1b is shown in greater detail in FIG. 2 in a half-sectional view. The tire 22 is a medium truck tire having a radial ply construction. Thus, tire 22 includes an innerliner 30, a steel-cord 90° radial carcass ply 32 having its respective ends 34 on either side of the tire turned axially and radially outwardly about the respective spaced apart annular tensile members 36, formed of cabled or wound steel wire, in the respective beads of the tire. The beads include a first apex 40 and a second apex 42 typically made of rubber compositions that are harder than those in the sidewall 44 and tread 46 of the tire. The bead also includes a chipper 46, and the toe region 48 of the tire may be strengthened with the use of a hard rubber chafer.

The tire 22 further includes a belt or breaker structure including a belt or breaker ply 50 and belt plies 52, 54 and 56.

The integrated circuit transponder 24 has an integrated circuit packaged portion 60 with a first electrode 61 extending from it in a direction toward the steel ply 32 and its turned up end 34, such that all or most of the surface area of the electrode 61 is closer to the steel cord ply 32 of the tire than is the surface area of the second electrode 62. The second electrode 62 extends both axially and radially away from the steel ply 32. Thus, the average spacing of the surface of the first electrode 61 from the steel cord in the ply 32 is substantially less than the average spacing of the surface of the second electrode 62.

It may also be noted that the second electrode 62 is further away from the annular tensile member 36, which as shown and typically is reinforced with wound steel wire, than is the first electrode 61 of the transponder. Thus, the average spacing of the surface of the first electrode of the transponder from the steel wire in a component of the tire, selected from the group consisting of the plies and the annular tensile members, is substantially less than the average spacing of the surface of the second electrode of the transponder from the steel wire in such component ply or annular tensile member.

It may be noted that the electrodes of the transponders 60 need not be elongated as shown in FIG. 2 in order to satisfy this requirement. Alternative electrode structures and arrangements are disclosed herein, but it should be noted that the arrangement shown in FIG. 2 is advantageous not only from the standpoint of the electrical requirement indicated in the preceding paragraph, but also from the standpoint of positioning between the separate apexes 40 and 42 in the bead of the tire. This permits the transponder 60 to be attached to one of these components prior to installation in the tire when it is being constructed in its green state on the building drum of a tire building machine.

The transponder can be attached to one of the apexes 40 or 42 prior to its being applied to the building drum or after such component has been applied. This operation occurs very early in the manufacture of the tire and permits its identification throughout the manufacturing process for purposes of control as it goes from station to station during fabrication and vulcanization, and also for purposes of process and inventory control. After cure of the tire, the transponder may be used as an identification means in warehousing and distribution of the tire. After sale of the tire, the transponder may be used in tire identification to control tire positioning on a vehicle and its retreading. Each of the transponders 60 in a tire may have a unique number that it transmits in response to an interrogation signal.

The difference in spacing of the two electrodes from the steel component of the tire is an essential feature of the invention. The "substantially less" average spacing difference depends upon the location of the transponder in the tire, the strength of the electric field emanating from source plate 28 and its location, the orientation of the electrodes of the transponder, and the characteristics of the rectification and clock-signal circuitry in the integrated circuit of the transponder. However, the electric field across the transponder electrodes must oscillate with the required frequency and with sufficient field intensity to power the integrated circuit and to cause it to transmit the numerical code stored within the transponder. The voltage on the source plate 28, when divided by the distance in meters to its ground reference, determines the magnitude of the electric field in free space. The steel-reinforced components in the tire 22 form equipotential surfaces to which the field lines must be perpendicular by definition, and this situation necessarily produces field gradients that affect transponder location and operability. When the tire is mounted on a wheel and rim, the equipotential effect of the rim may need to be taken into account with respect to positioning of the interrogation wand and its field strength.

Figure 3:
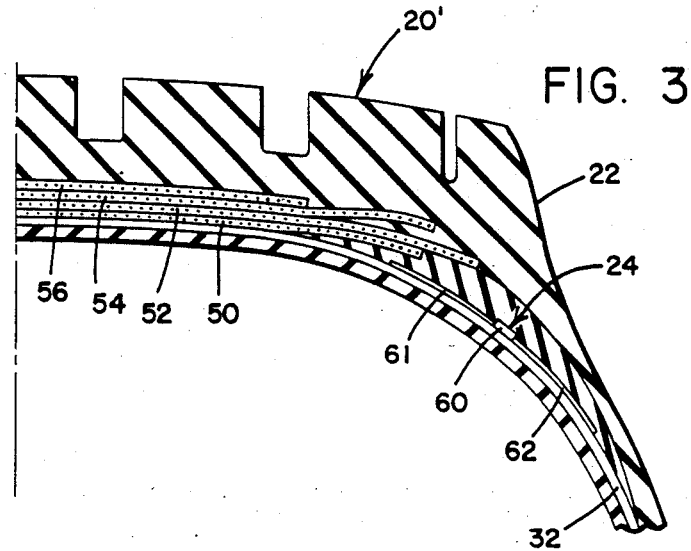
FIG. 3 is a partial sectional view of the tire of FIG. 2 showing the integrated circuit transponder at an alternate location.

In FIG. 3, there is shown a partial sectional view of the truck tire 22 having the transponder 24 positioned to extend between the shoulder and sidewall of the tire. The resulting combination tire and transponder is identified as 20'. In this tire, the ply 32 extending continuously between the annular tensile members in the respective beads of the tire preferably is made of textile material. The first electrode 61 of the transponder 24 extends parallel with the ply 32, as can its second electrode 62 if ply 32 is reinforced with textile cords. If steel cords are used in ply 32, it may be desirable to have electrode 62 extend away from ply 32. The resulting structure meets the electrical requirement of the invention that the average spacing of the surface of this first electrode of the transponder from the steel wire in a component of the tire be substantially less than the average spacing of the surface of the second electrode of the transponder from the steel wire in such ply.

Figure 4:
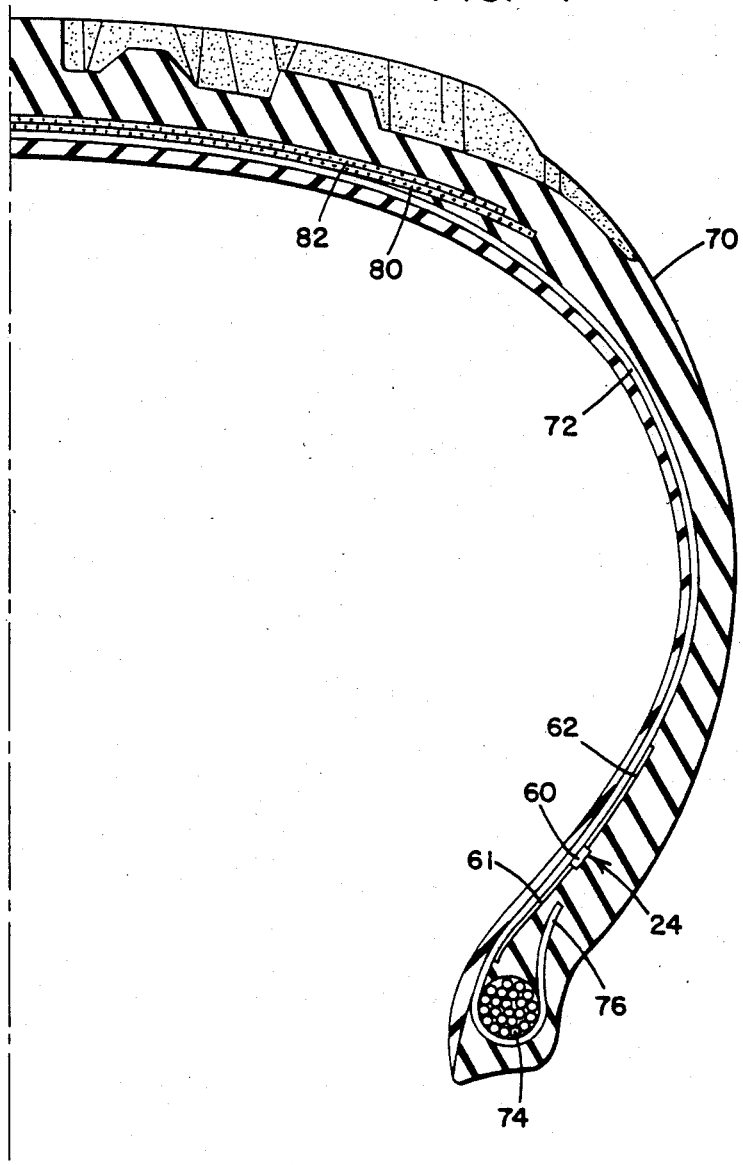
FIG. 4 is a half-sectional view of a radial-ply passenger tire having an integrated circuit transponder within its structure.

FIG. 4 is a half-sectional view of a radial-ply passenger tire 70 having a textile-cord reinforced carcass ply 72 and a steel-wire annular tensile member 74 in its bead structure, about which the end 76 of the ply 72 is turned. The tire 70 also has steel-reinforced belt plies 80 and 82.

In the tire 70 illustrated in FIG. 4, the transponder 24 has its first electrode 61 positioned near the wire annular tensile member 74 in the tire bead. The first and second electrodes 61 and 62 extend from the integrated circuit package 60 of the transponder 24 parallel with the surface of the ply 72, which in the passenger tire preferably is reinforced with polyester cord. This nonconductive cord enhances the manner in which the transponder 24 behaves, when positioned in the manner indicated in FIG. 4, because the first electrode 61 has its surface positioned substantially closer to the wire in the annular tensile member 74 than does the second electrode 62 of the device. While this would also be true were the ply 72 to be reinforced with steel cord, the steel in the ply 72 would form an equipotential surface that would make the orientation for the transponder 24 depicted in FIG. 2 much more desirable.

Figure 5:
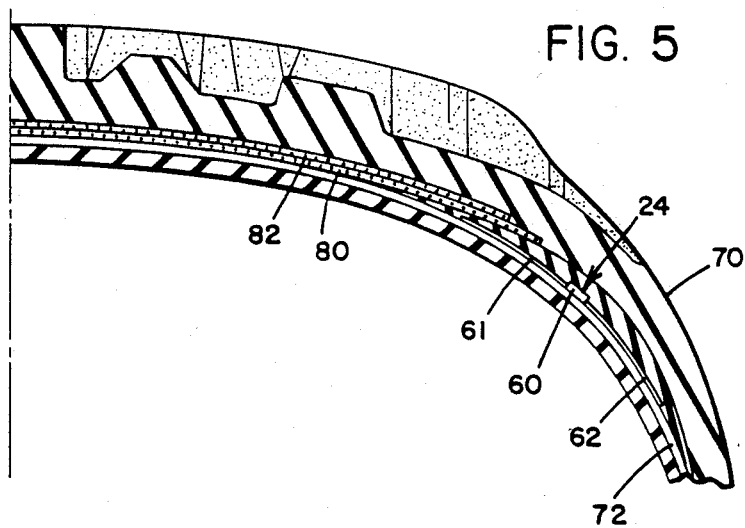
FIG. 5 is a partial sectional view of the tire of FIG. 4 showing an alternate location for the transponder.

FIG. 5 is a partial sectional view of the tire 70 of FIG. 4, but the transponder 24 has its first electrode 61 positioned under the edge of the steel-reinforced belt ply 80. Both this first electrode and the second electrode 62 extend parallel with the surface of the textile-reinforced ply 72, but the average distance of the surface of the electrode 61 to the steel in the belt ply is substantially less than is the average distance of the surface of the second electrode 62 to such ply.

The locations of the transponder 24 in FIGS. 3 and 5 for the respective truck and passenger tires are considered less desirable than the bead locations depicted in FIGS. 2 and 4. Stresses and deflections in the shoulder regions and sidewalls of the tires are higher than in the bead regions, which are stiffer and tend to deflect very little.

Figure 6:
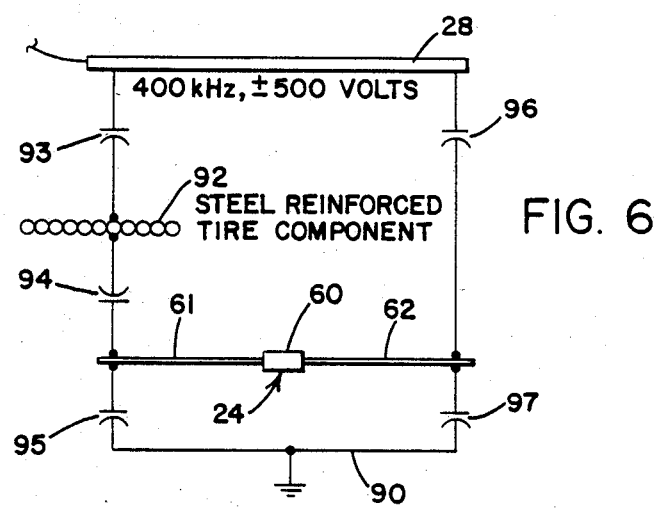
FIG. 6 is a schematic equivalent circuit illustrating the manner in which oscillatory R/F electrical energy is capacitively coupled into and out of transponder when positioned in a tire.

FIG. 6 is a schematic electrical diagram illustrating why it is electrically important for the average spacing of the surface of the first electrode of the transponder 24 from the steel wire in a tire component to be substantially less than the average spacing of the surface of the second electrode 62 of the transponder from such steel wire.

In FIG. 6, the numeral 28 designates the plate on the end of the wand 26 in the exciter and signal conditioner unit 12 of the tire identification interrogation and display system 10 of FIG. 1. The plate 28 preferably has a 400 kHz oscillating electrical voltage on it that is generated in a manner hereinafter described. The oscillating voltage preferably oscillates about ground potential, as schematically indicated at 100, with a peak-to-peak variation between about +500 and −500 volts. The ground at 90 is determined by the surroundings of the tire in relation to the power supply 16 and its ground connections. Other voltages may be used, and higher voltages may be desirable in certain applications in order to provide sufficient electric field intensity across the transponder's first and second electrodes.

The plate 28 in FIG. 6 is a source of an oscillating electric field which at 400 kHz alternates in direction between the source 28 and ground at 90. The electrodes 61 and 62 of the integrated circuit transponder 24 are within the electric field. The steel-reinforced tire component 92 also is within the electric field. Due to the conductivity of the steel cords in the component 92, the component is at an equipotential in the electric field and the field lines must be perpendicular to this equipotential surface. reinforced carcass ply, then the entire ply forms an equipotential surface. With one of the electrodes 61 of the transponder having its surface located substantially closer to the component 92 than is the surface of the other electrode 62, the equipotential of the component 92 forces the electrode 61 to have a different potential on it than occurs at the other electrode 62 not influenced by the equipotential of the component 92. In other words, the steel component 92 creates capacitive coupling between the source 28 and ground as indicated by the series of capacitances 93, 94 and 95. The second electrode 62 in the circuit is capacitively coupled by the two capacitances 96 and 97. This produces an oscillatory voltage or electric field across the electrodes 61 and 62 of the transponder 24 in response to the 400 kHz interrogation voltage applied to the plate constituting the source 28; if the oscillating voltage across the electrodes 61 and 62 of the circuit 60 in the transponder is sufficient to provide the electrical energy source required by the circuitry of the passive transponder 24, then the transponder will be energized and will be enabled to transmit its identification signal.

It should be noted that the wavelength of the 400 kHz interrogation signal is 750 meters. This long wavelength means that electrodes 61 and 62 do not act as an "antenna" in the usual sense.

The identification signal is sensed at the plate 28 and is in the form of a 40-to-50 kHz, frequency-shift-keyed (FSK) signal that is coded. Demodulation of this FSK signal enables the tire to be identified by display or by transmission of the demodulated (decoded) signal to a computer, printer or other device.

Figure 7:
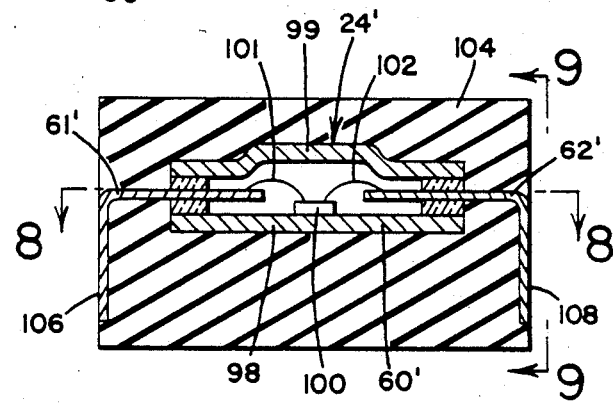
FIG. 7 is an enlarged elevational view of a hermetically sealed transponder having plates formed from a lead frame and embedded in an elastomeric material.

FIG. 7 depicts in enlarged sectional elevational view an hermetically-sealed semiconductor package embedded in an elastomeric material to form a transponder 24'. This transponder 24' and integrated-circuit package 60' within includes a metal base plate 98 and a metal top cover 99. An integrated circuit die 100 is attached to the base plate 98 and has a first lead wire 101 and a second lead wire 102. Lead wire 101 extends between a first pad on the die 100 to the first electrode 61' of package 60'. The second lead wire 102 extends from a second pad on the die 100 to a second electrode 62' in the package 60'. The electrodes 61' and 62' are spaced from one another and bent at 90° angles to form surfaces or "plates" of metal which are parallel to one another and enlarged, as is more clearly depicted in the plan view of the device 60' shown in FIG. 8 and in the end view of FIG. 9.

Figure 8:
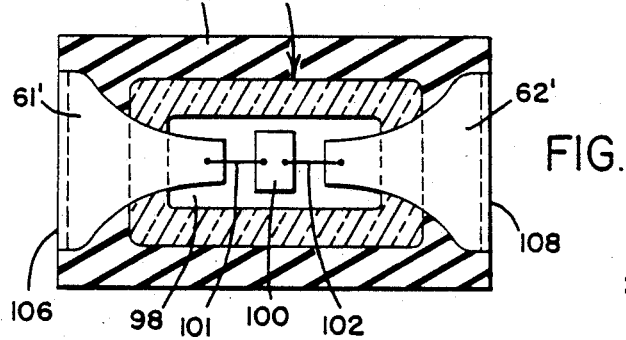
FIG. 8 is a plan view of the transponder of FIG. 7.

FIG. 8 depicts the package 60' with the top cover 99 removed. The transponder and its first and second plate electrodes 61' and 62' are inserted in an elastomeric material, which preferably is a polyether urethane chemically reacted from a mixture of liquids to form a solid. Such materials are commercially available from UTI Inc. of Santa Anna, Calif., and others and can be made to have rapid phase transitions from the liquid state to the solid state. The elastomeric material 104 in which the components described above are embedded preferably is cylindrical in shape to facilitate insertion of the device into the apex of a pneumatic tire, or perhaps under its belt structure, such that the plate 61 has its surface 106 parallel to the plane of the steel wire or cords in one of the components of the tire. This causes the surface 108 of the other or second electrode 62 prime to be spaced further from such tire component than the surface 106 and allows the required oscillating voltage between the electrodes to be generated in response to the 400 kHz oscillating field on the plate or source of electrical energy 28 during interrogation for tire identification.

Figure 9:
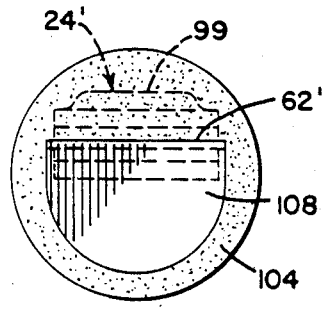
FIG. 9 is an end view of the transponder of FIGS. 7 and 8.
Figure 10:
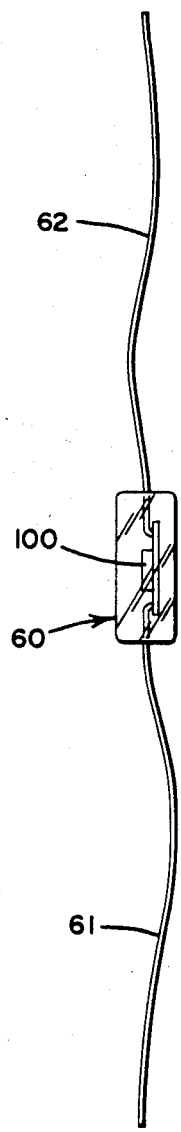
FIG. 10 is an enlarged view of a hermetically sealed transponder having a pair of lead wires extending from the hermetically sealed package rather than the lead-frame plates shown in FIG. 7.

The package 60' for the integrated circuit transponder 24' of FIGS. 7 to 9 is a design based upon U.S. Pat. No. 4,805,009 issued Feb. 14, 1989, to Pryor, et al. for an "Hermetically Sealed Semiconductor Package" and assigned to Olin Corporation of New Haven, Conn. Other techniques for extending electrodes from the integrated circuit die 100, such as glass encapsulation, can be used. FIG. 10 illustrates an integrated circuit package of this kind having the wire electrodes 61 and 62 extending from it to form the transponder 24.

Figure 11:
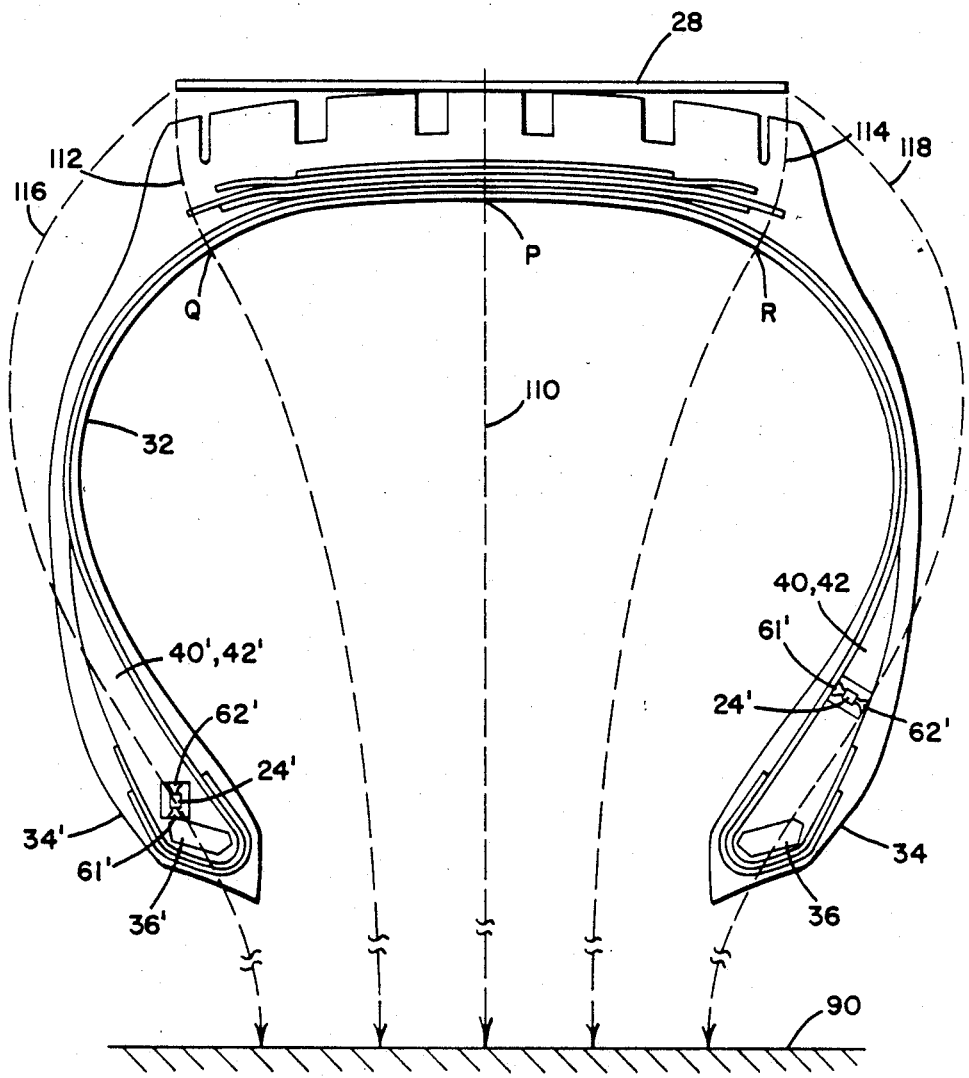
FIG. 11 is a sectional view of a tire containing transponders of the type illustrated in FIGS. 7 through 9, the tire being shown with a source of A/C energy and electric field lines emanating from such source as they go to a ground plate.

With reference now to FIG. 11, there is shown the source of oscillating electrical energy 28, the ground potential 90, and a schematic view of the spaced annular tensile members 36, 36', and the steel-cord reinforced carcass ply 32 with its respectively turned up ends 34, 34' taken from the truck tire 22 shown in FIG. 2. The respective beads of this tire include apexes 40, 42 and 40', 42'. The apexes 40, 42 in the right-hand bead of this tire include the transponder 24' illustrated in FIGS. 7 to 9, as do the apexes 40', 42' in the left-hand side of this tire. However, the left-hand bead has the transponder 24' oriented differently than the transponder 24' in the right-hand bead. In the left-hand bead, the plate or first electrode 61' of the transponder is positioned adjacent the tire's annular tensile member 36' and the other plate or second electrode 62' is more remote therefrom. In the right-hand bead, the plate 61' is adjacent to the parallel steel cords in the ply 32 and the second plate or electrode 62' is more remote therefrom. In both cases, the second electrode or plate 62' extends axially and/or radially away from the steel-reinforced tire component to which the first electrode or plate 61' is parallel.

The broken lines in FIG. 11 depict electric field lines as they are estimated to be oriented with respect to the tire components as they go from the source 28, when positive, to ground potential at 90. The center field line 110 is perpendicular at point P to the steel cords in the carcass ply 32, which is an equipotential component to which the other field lines 112 and 114 depicted in FIG. 11 must be perpendicular at the points of intersection Q and R. The fact that the steel-cord ply 32 must be an equipotential surface and the field lines passing through it perpendicular to it, and the presence of external field lines such as shown at 116 and 118, allows an oscillating potential difference to appear across the electrodes 61',62' of the integrated circuit transponder 24' to energize it in response to the 400 kHz interrogation signal emanating from the source 28.

Figure 12:
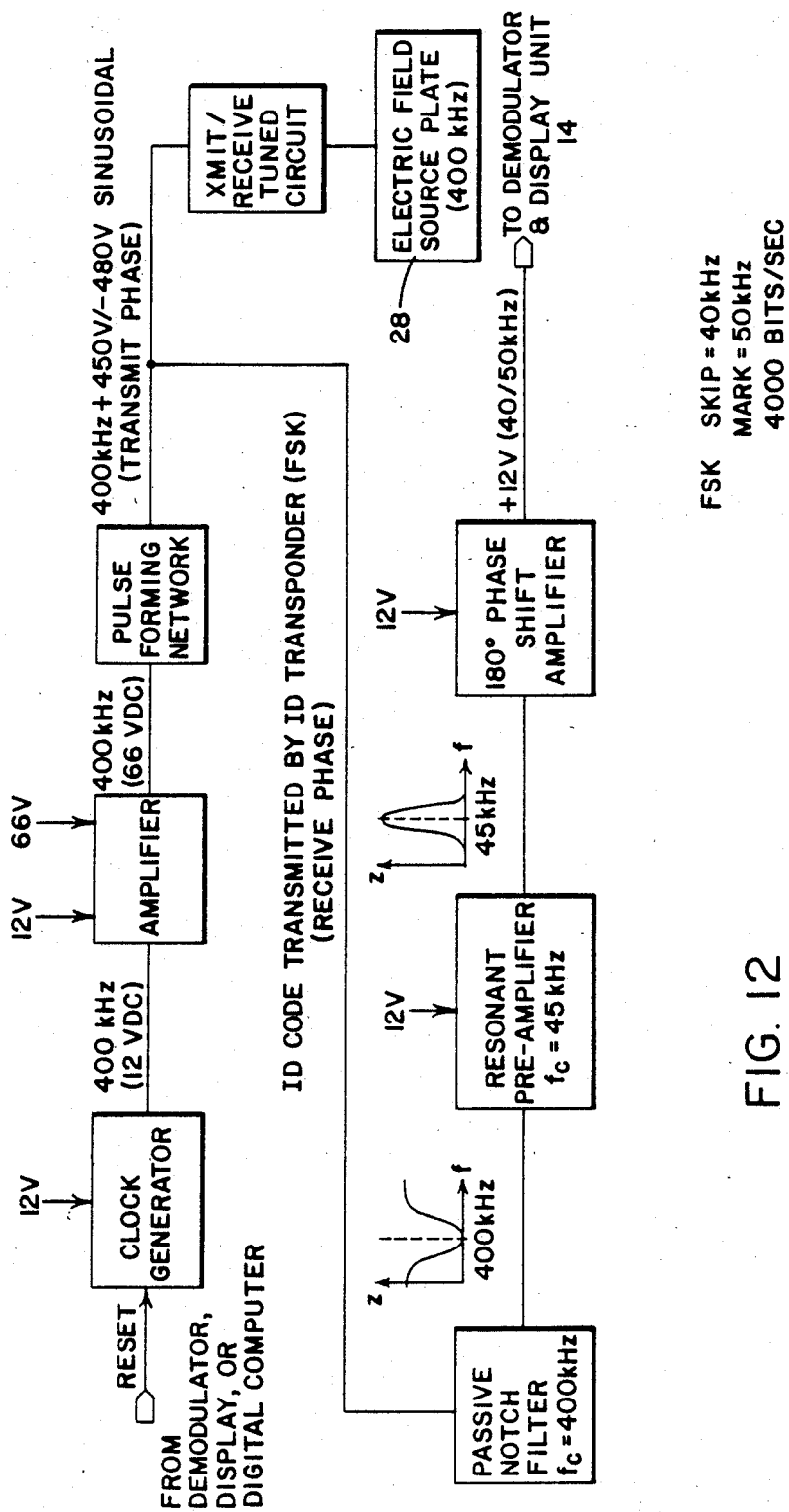
FIG. 12 is an electrical block diagram of circuitry in the exciter and the signal conditioner unit 12 shown in FIG. 1.

FIG. 12 is a block diagram of the circuitry included in the exciter and signal conditioner unit 12 shown in FIG. 1. This circuitry functions in a manner similar to that disclosed in Milheiser U.S. Pat. No. 4,730,188, is commercially available from Destron/IDI of Boulder, Colo., and is included here because some improvements in the circuitry over that depicted in the aforementioned patent are known to the inventors and may enhance the use of the combination tire and transponder of the invention.

From FIG. 12, it may be seen that a reset signal is applied to a clock generator that produces a 400 kHz oscillatory voltage at its output This signal, which comes from a trigger switch on unit 12, is amplified from 12 volts to 66 volts D/C and is supplied to a pulse-forming network. At the output of the pulse-forming network, a 400 kHz signal oscillating between 450 volts positive and 480 volts negative with respect to ground is produced. This voltage is supplied to a tuned circuit including a coil to which the source plate 28 of the electric field previously described is coupled.

When the source plate 28 receives the lower frequency 40/50 kHz signal emanating from the transponder in a tire, this signal is transmitted to a passive notch filter, which has a low impedance to ground for the 400 kHz transmitted signal and which passes through the lower frequency signal to a resonance preamplifier tuned to 45 kHz. The preamplified identification signal from the integrated circuit transponder in the tire then passes through a 180° phase-shift amplifier and is transmitted to the demodulator and display unit 14.

Figure 13:
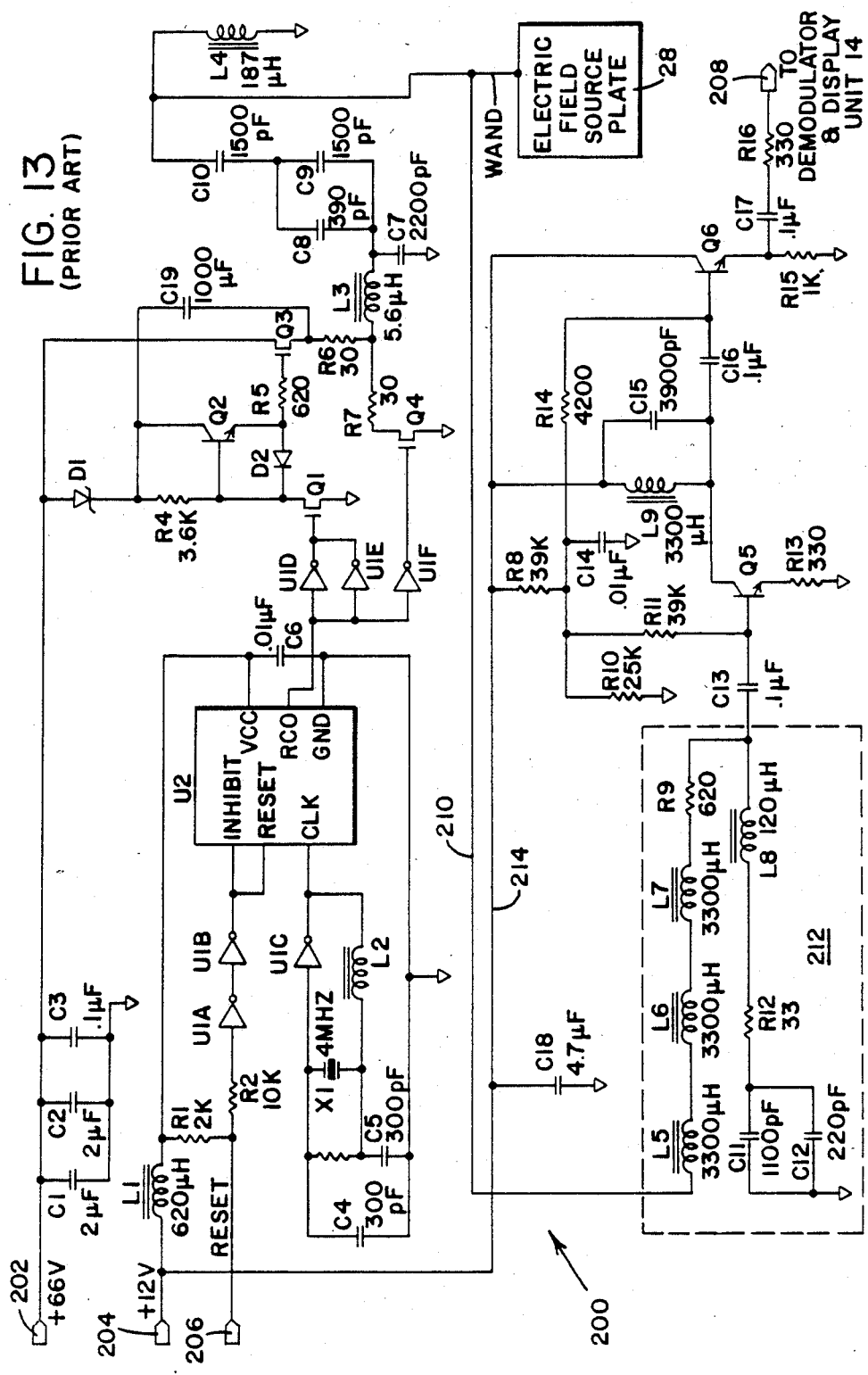
FIG. 13 is a detailed schematic diagram of the exciter and signal conditioner circuitry shown in block form in FIG. 12.

FIG. 13 is a detailed schematic diagram of the circuitry shown in FIG. 12. The circuitry, generally designated by the numeral 200 in FIG. 13, acts as an exciter, via the electric-field source plate 28, for the remotely located transponder being interrogated. The circuitry 200 also functions as a conditioner for the signal transmitted from the transponder in the pneumatic tire in response to the 400 kHz interrogation signal. After the return signal is conditioned, it is transferred to the demodulator and display circuitry in the unit 14 shown in FIG. 1.

The circuit 200 includes D/C voltage input lines having terminals 202 and 204. Sixty-six volts D/C is applied to the terminal 202 and 12 volts D/C is applied to the terminal 204, these voltage being provided by the power supply 16 (FIG. 1). A terminal 206 receives a reset signal from a push/button trigger on the hand-held module 12 in which the exciter and signal conditioner circuitry 200 are incorporated. Upon receipt of the identification signal from the transponder, this signal is made available to the demodulator and display device 14 at terminal 208.

When the push/button trigger on the unit 12 is depressed, the reset signal is applied at terminal 206 and the electric field source plate 28 has applied to it an oscillatory voltage that immerses the pneumatic tire 20 in a correspondingly oscillating electric field. The pulse train on the source plate 28 has a duration of approximately 20 milliseconds that is then followed by a dead time of approximately 20 to 30 milliseconds. The pulse train has a frequency of 400 kHz with the essentially sinusoidal wave shape depicted in FIG. 14. The voltage variations are with respect to a zero or ground potential represented by the ground symbols illustrated in FIG. 13. Preferably, this ground reference is the same as building or machinery ground in the vicinity of tire identification.

The circuitry that creates the transmission or interrogation signal described above includes the CMOS decade counter U2 whose clock signal is derived from a 4 MHz crystal oscillator X1. The clock signal is a square wave that is generated at the RCO output of U2, which drives an unbalanced push/pull amplifier stage that includes transistors Q1, Q2, Q3 and Q4. The push stage of the amplifier uses the clock signal to drive Q1, which in turn drives Q2 and Q3. The diode D2 is placed across the emitter to base of Q2 to insure that Q1 will not go into deep saturation, thereby, resulting in faster switching times. The pull section of the amplifier uses the clock signal to directly drive Q4, the output of which is connected to the common node through a 30 ohm resistor R7. Capacitor C19 is placed across the collector of Q2 and the source of Q3. This bootstrap capacitor supplies more drive voltage to the gate of Q3 to drive it deeper into saturation. The resulting waveform is passed through the filter including inductor L3 and capacitors C7, C8, C9 and C10, at which point it is applied to the electric field source plate 28.

The filter comprising the inductor L3 and capacitor C7 allows the signal at their juncture to be applied to a series/resonant circuit including parallel capacitors C8 and C9, series-connected capacitor C10, and inductor L4. The voltage at the junction between the capacitor C10 and the inductor L4 is very high due to the series resonance and is applied to the electric-field source plate 28.

The signal conditioner or receiver portion of the circuitry 200 is coupled to the junction between the series/resonant capacitors and inductor L4 to provide a line 210 on which will occur the oscillatory data or identification signal transmitted to the plate 28 from the transponder in the tire 20 after interrogation by the 400 kHz signal. The signal conditioner amplifies the identification signal returned from the transponder while at the same time removing the 400 kHz excitation or interrogation signal. Transistor Q5 is an emitter/follower having a capacitor C13 providing A/C coupling to its base. The passive notch filter, shown in FIG. 12, is comprised of the inductors L5, L6, L7 and L8, resistors R9 and R12 and capacitors C11 and C12. These components effectively provide zero impedance to ground for the 400 kHz excitation signal. The notch filter 212 is very similar to circuitry included in FIG. 3 of the Milheiser patent, which circuitry is described as a low-pass filter. The circuitry 212 passes the low-frequency (40 to 50 kHz) signal from the transponder through the capacitor C13 to the base of the transistor Q5.

Transistor Q5 has its collector coupled, through the inductor L9 and capacitor C15, to the 12 volt D/C supply voltage that appears on line 214. L9 and C15 resonate at a center frequency of 45 kHz. The output of the emitter follower transistor Q5 is A/C coupled through capacitor C16 to an inverting amplifier including transistor Q6. The signal occurring at the emitter of transistor Q6 is A/C coupled through capacitor C17 and resistor R16 to the terminal 208 and thus made available to the demodulator and display unit 14.

Figure 14:
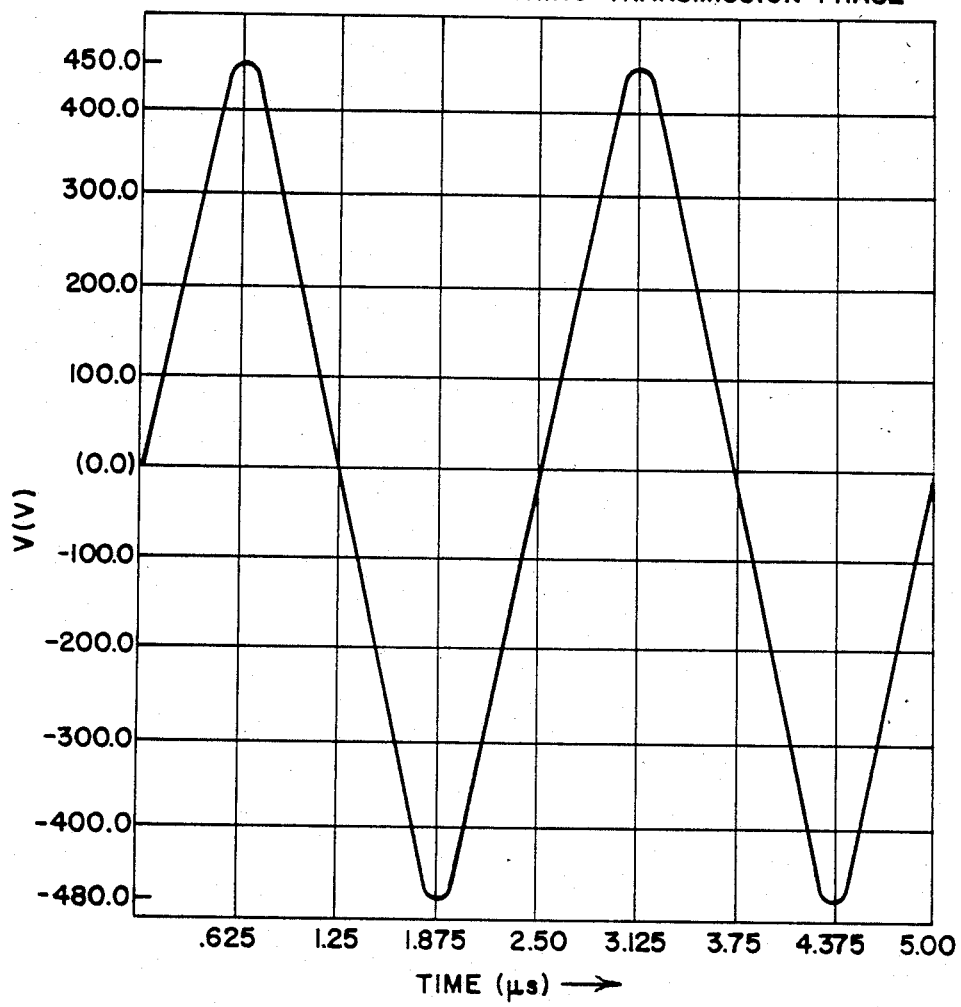
FIG. 14 illustrates the oscillating R/F or A/C voltage appearing on the electric field source plate used in interrogating the transponder in a pneumatic tire.

The circuitry described in connection with FIGS. 12 through 14, and the integrated circuit transponder hereinafter to be described in connection with FIGS. 15 through 24, exemplify prior art devices that are commercially available from Destron/IDI, Inc. The Destron/IDI integrated circuit transponder transmits a frequency shift keyed (FSK) signal with a transmission rate of 4,000 bits per second. transmission. The FSK encoding technique involves the modulation of a signal between two frequencies depending upon the state of a digital data signal. The exciter and signal conditioner unit 12 available from Destron/IDI transmits the 400 kHz exciter or interrogation signal, which the integrated circuit transponder 100 then uses both for a clock and as its internal supply voltage. In response to this clock and supply voltage, the transponder 100 transmits its identification signal with FSK encoding and the signal conditioner circuitry described above amplifies the identification signal, which varies in frequency by changing back and forth from 40 kHz to 50 kHz. The signal conditioner then makes the amplifier signal available to the demodulator and display unit 14.

The detailed description which follows although of a prior art device, reflects the best mode known to the inventors for carrying out the claimed invention and represents an improvement over the transponder described in Milheiser U.S. Pat. No. 4,730,188.

Figure 15:
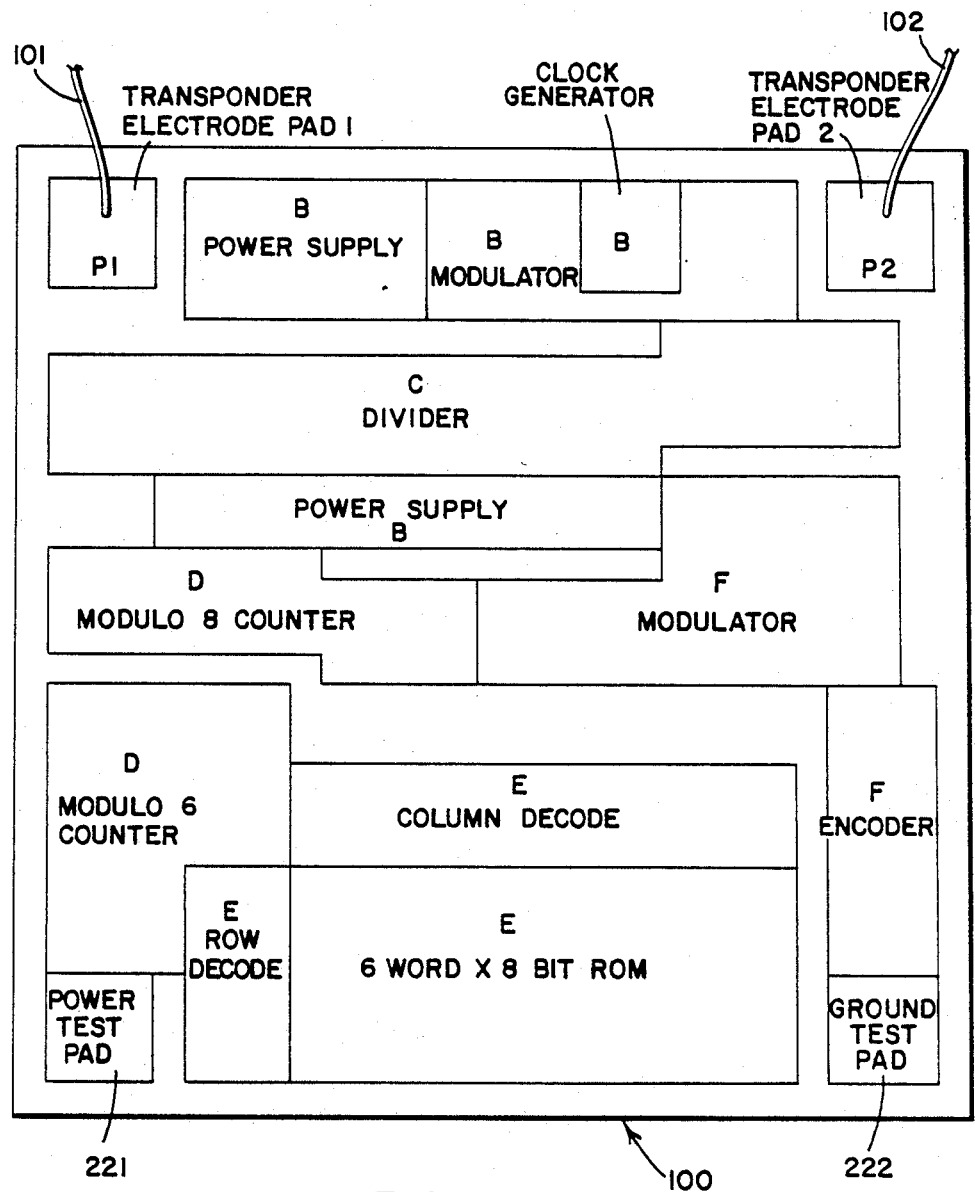
FIG. 15 is a physical-layout block diagram of an integrated circuit of a transponder to be used in combination with a pneumatic tire for purposes of identification.
Figure 20:
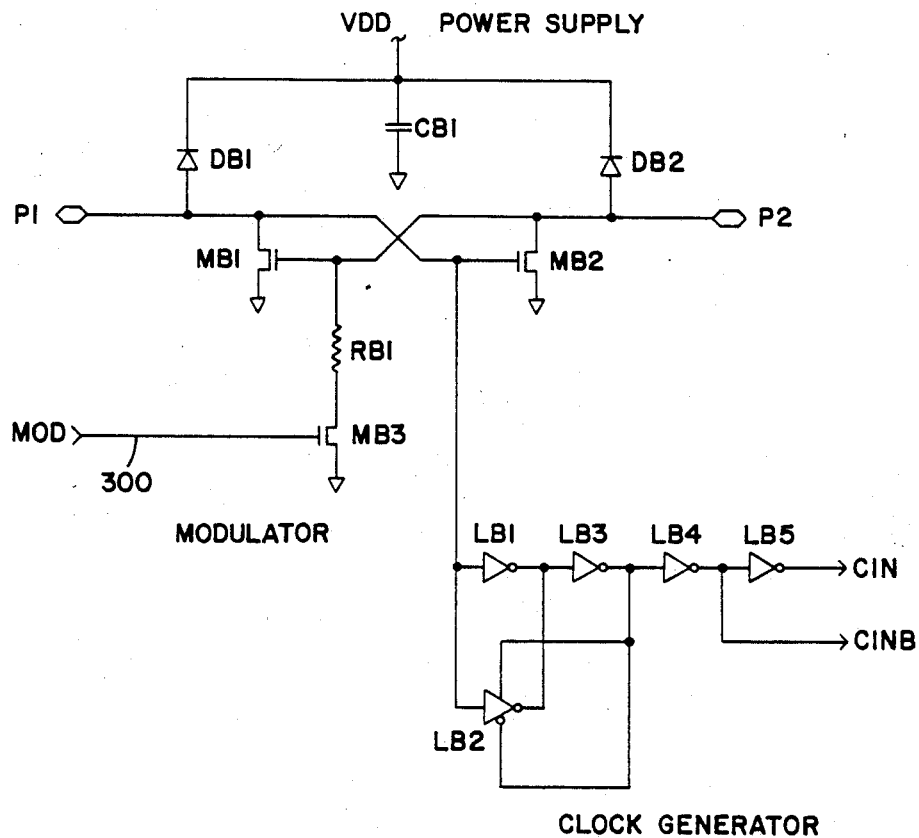
FIG. 20 is a schematic electrical diagram of the power supply, modulator and clock generator circuits in the integrated circuit of FIG. 15.
Figure 21:
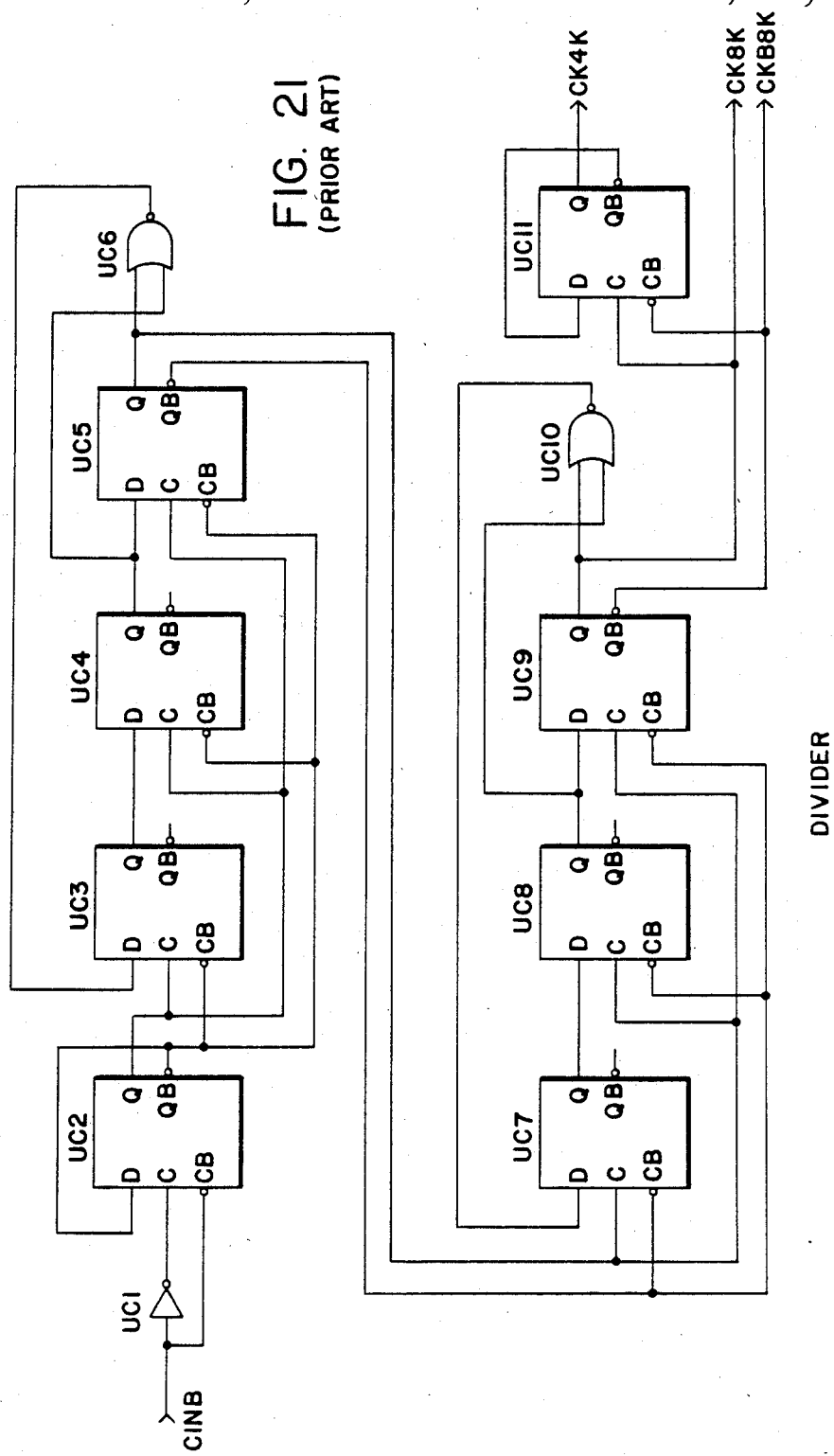
FIG. 21 is a schematic diagram of the divider in the integrated circuit of FIG. 15.
Figure 22:
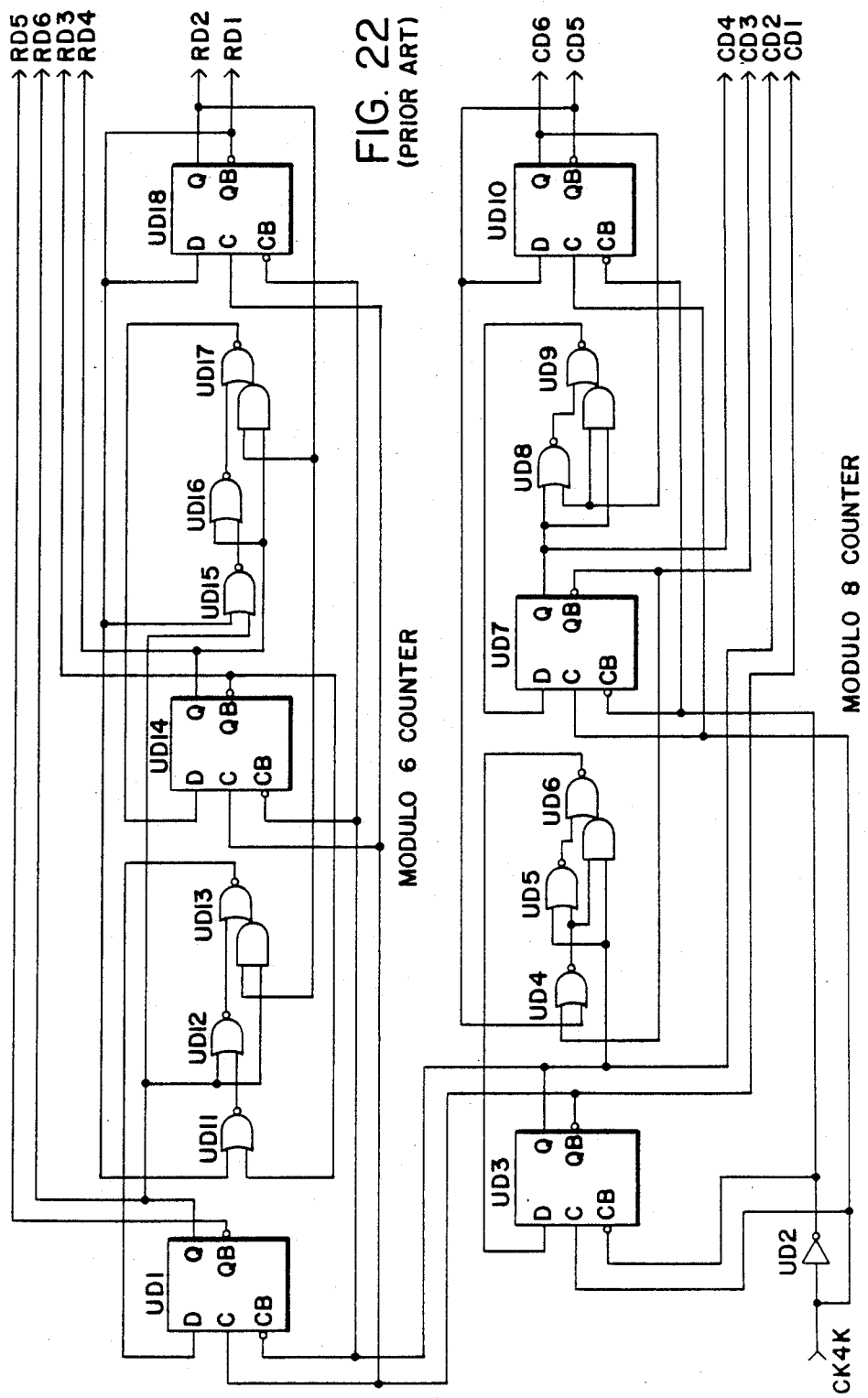
FIG. 22 is a schematic diagram of the modulo six and modulo eight counters in the integrated circuit of FIG. 15.

In FIG. 15, there is shown the prior art integrated circuit transponder chip or die 100 that has been commercially available from Destron/IDI or its predecessor company. The die 100 is square and has side dimensions of 1.10 millimeters. The fabrication technology is three-micron-feature CMOS with P-substrate and N-type wells. For input and output, it has four pads: P1 and P2 and power and ground test pads 221 and 222. The lead wires 101 and 102 are respectively bonded to pads P1 and P2 and connect to the first and second electrodes of the transponder in the manner previously described. The various circuit portions are delineated in FIG. 1 by boundary lines that identify the areas they occupy on the die 100. The letters B, C, D, E and F in these portions are used in FIGS. 20 through 24 as partial identification for components in the integrated circuit die. In these Figures, the letters of FIG. 15 appear as the center letter in the designation for the various devices schematically illustrated. For example, in FIG. 20, the diode DB2 is the second such diode, which is indicated by the numeral "2" and by the letter "D", and is in the portion of the die 100 having the "B" designation in FIG. 15. Similarly, a type-D flip-flop UC7 shown in FIG. 21 is a unified device found in the divider section "C" in FIG. 15 and is the seventh of such devices illustrated.

Figure 16:
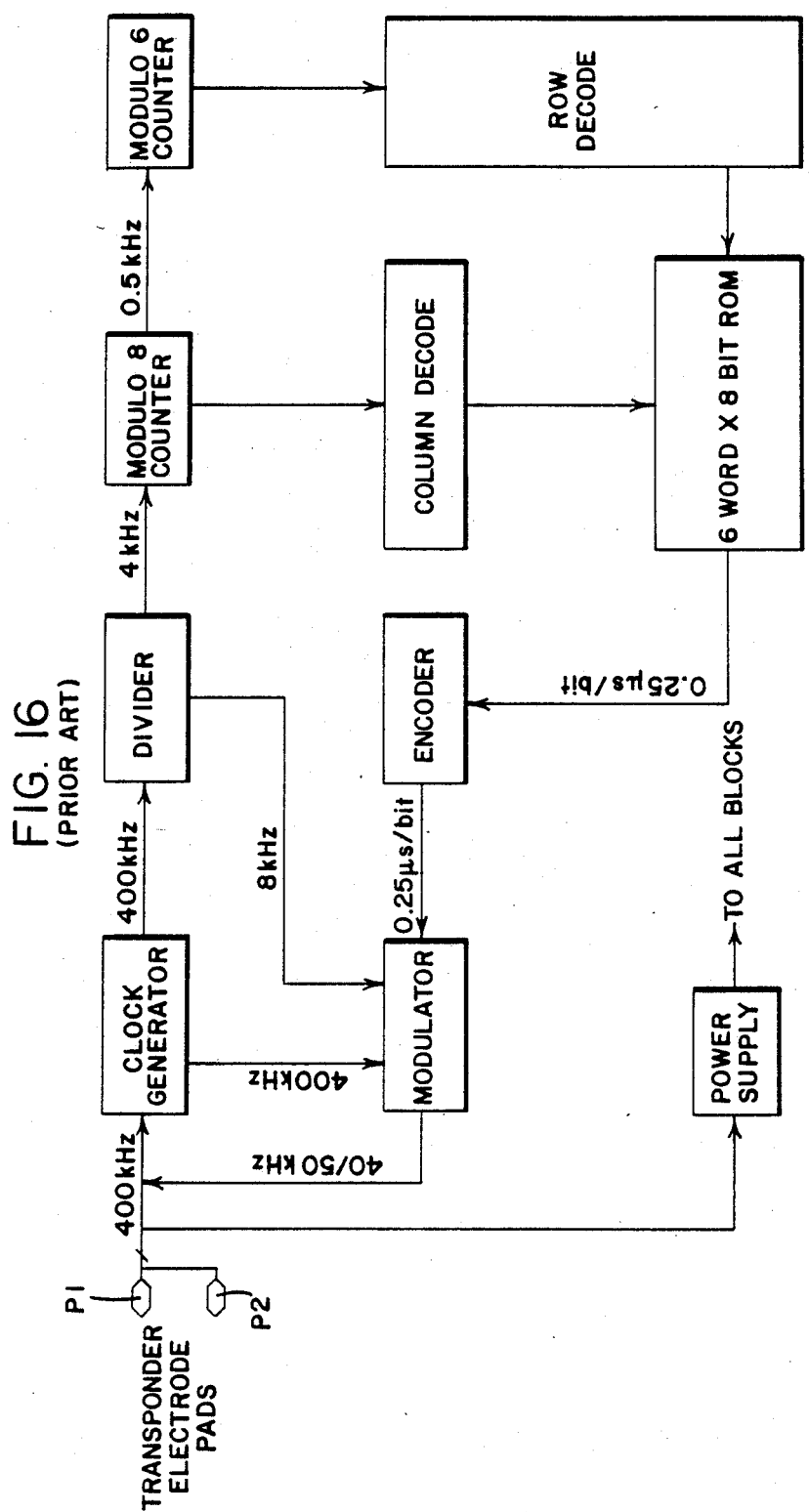
FIG. 16 is a schematic block diagram of the circuitry included on the integrated circuit of FIG. 15.
Figure 17:
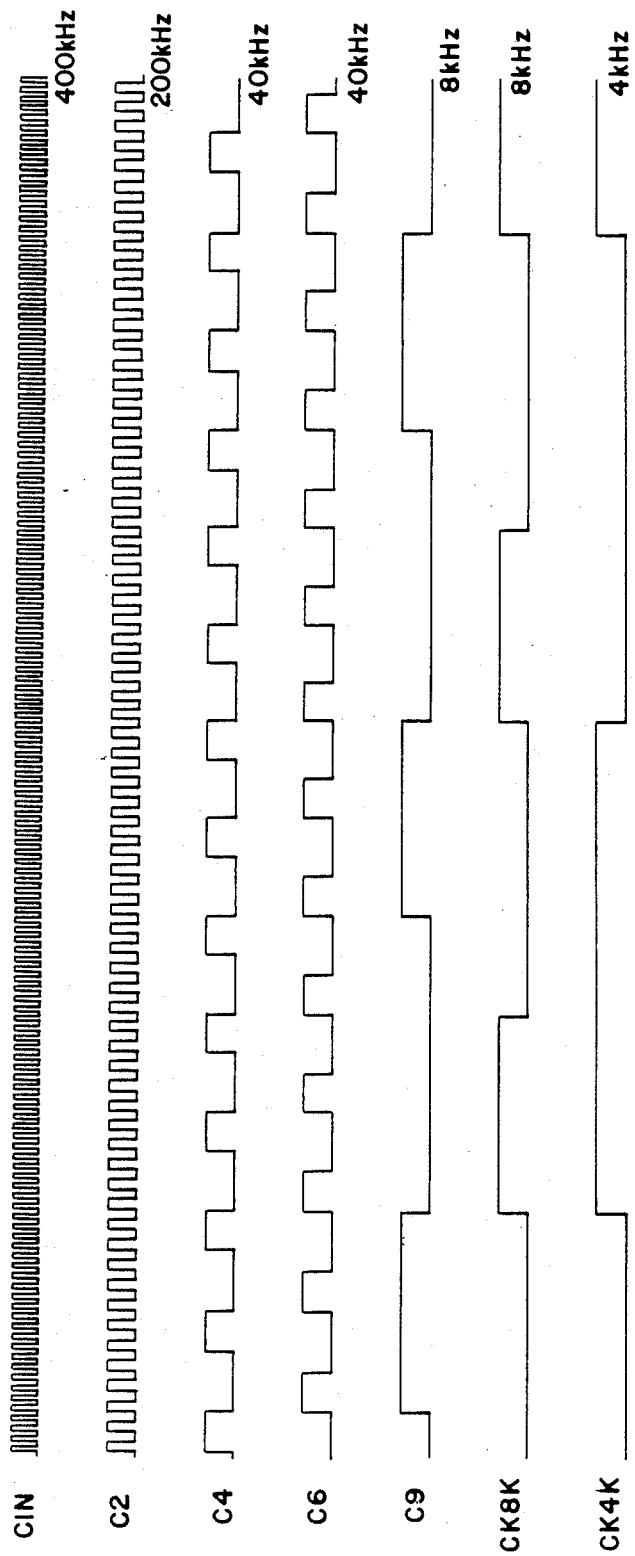
FIG. 17 illustrates the timing of signals in the clock generator and divider circuits of the integrated circuit of FIG. 15.

From FIG. 15 illustrating the layout of the die and FIG. 16, which is a block diagram of the circuitry on the die, it may be seen that a power supply receives the 400 kHz excitation signal transmitted from the unit 12 and from it supplies power to the various blocks included in the die 100. The 400 kHz signal also is applied to a clock generator, which uses the 400 kHz signal in conjunction with a modulator that controls the 40 to 50 kHz signal applied as an oscillatory voltage across the pads P1 and P2 of the transponder. The clock generator produces a 400 kHz clock pulse that is divided as shown in FIG. 17 to produce a 4 kHz signal that is applied to the modulo 8 counter. The resulting 0.5 kHz signal is applied both to a modulo 6 counter and to a column decode device which has associated with it a six word by eight-bit read-only memory. Row decode of the read only memory (ROM) is accomplished through use of the signal produced at the output of the module six counter and row decode circuit The ROM thus has 48 bits of coding for transmission as an identification signal via FSK modulation of a 40 to 50 kHz signal. Twenty-four of the bits (3×8) are metal-mask programmable and the other twenty-four bits (3×8) are field programmable through window openings in the passivation of the integrated circuit die 100.

Figure 23:
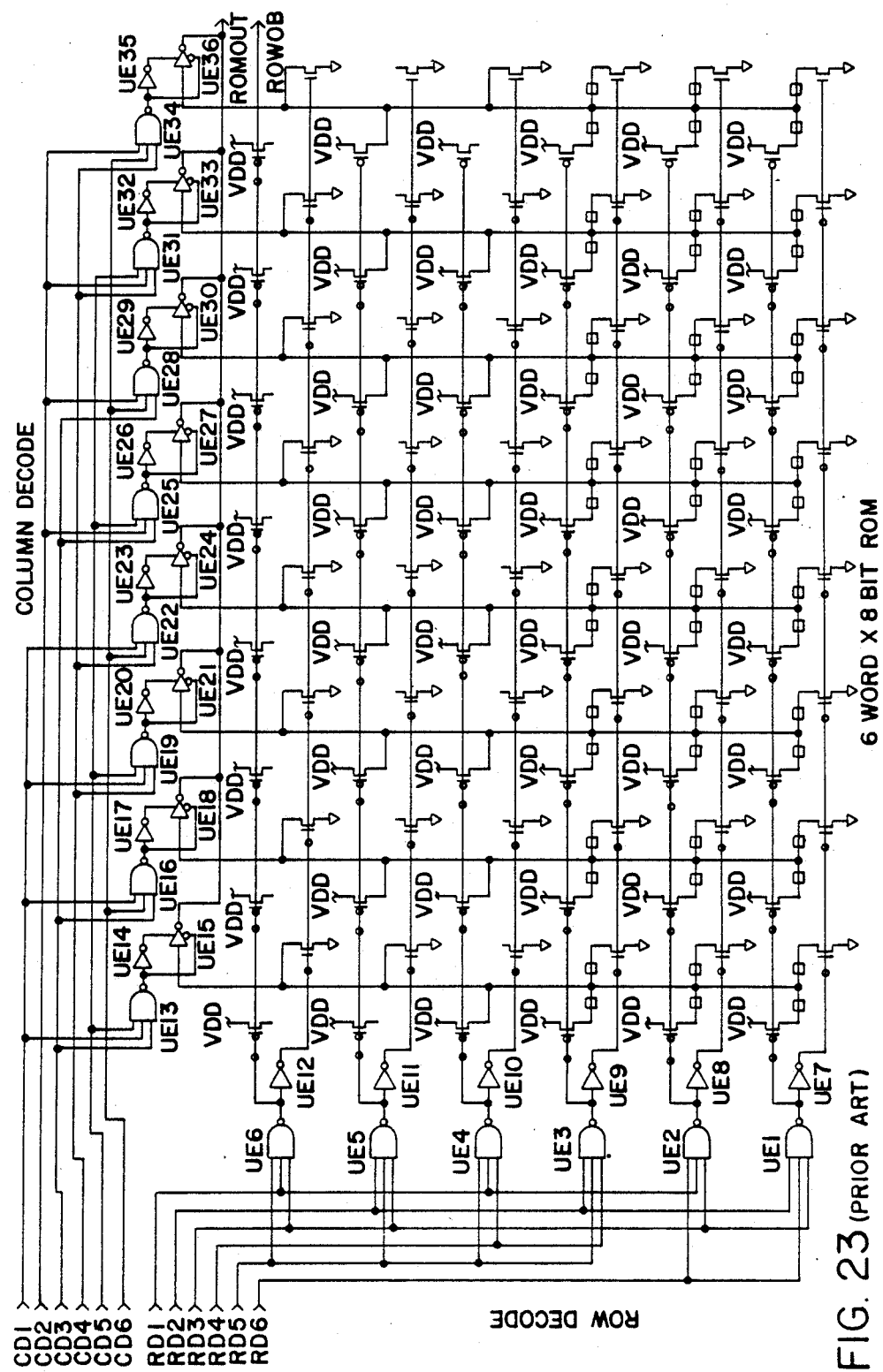
FIG. 23 is a schematic diagram of a row and column decode circuit and data matrix included in the integrated circuit of FIG. 15.

The details of the ROM circuitry containing the identification code for a pneumatic tire are included in the schematic diagram of FIG. 23. The device has column decode lines CD1 through CD6 and row decode lines RD1 through RD6. The row decode lines are connected to gates and inverters UE1 through UE12, and the column decode lines are connected to gates and inverters UE13 through UE36. The D/C supply voltage VDD is supplied to all of the field effect transistors in the ROM array. There are a total of ninety-six (96) (2×48) field effect devices in the ROM array, two of the devices being for each of the data bits and only one of the two devices providing zero or one logic level in the array depending upon its programming. The first three words or twenty-four bits of data in the ROM are mask programmed. The data is written when the die 100 is fabricated via the metal mask used in its manufacture. The last three words or twenty-four bits are programmed after chip fabrication is completed. During fabrication of the die, small windows or openings in the passivation are left over each of the twenty-four bits which are not programmed with the metal mask: through these windows a laser can be used with the small windows or openings to remove either the zero or one connection for the data bits that are programmable after chip fabrication has been completed. The first word in the ROM is a start word. It is encoded differently by the encoder based upon its row address of 000. Each of the remaining five words have seven data bits and one parity bit. The left most bit (column address 000) is the parity bit. This bit is a one if an even number of the remaining seven bits are ones and a zero otherwise.

The data from the ROM goes to the encoder. The encoder marks the fifth and seventh bits of the first word (address 000100 and 000110) with a unique code permitting this word (row address 000) to be recognized as the start word. Except as to the fifth and seventh bits of the first word, all zeros from the ROM are encoded as a transition from a low level to a high level and all ones are encoded as a transition from a high level to a low level. These zero and one transitions from low to high and from high to low, respectively, occur in the middle of the bit period, which is 0.25 milliseconds long. Thus, after encoding each data bit is a zero for 0.125 milliseconds and a one for 0.125 milliseconds if the bit is a zero and is a one for 0.125 milliseconds and a zero for 0.125 milliseconds if the bit is a one.

The encoded data goes to the modulator where frequency shift keying (FSK) is the modulation technique employed. A zero from the encoder becomes a 50 kHz signal, while a one becomes a 40 kHz signal. Therefore, a data bit zero from ROM is modulated as a 40 kHz signal for 0.125 milliseconds (five cycles) followed by a 50 kHz signal for 0.125 milliseconds (6.25 cycles). A one data bit from ROM is modulated just opposite to this, that is, a 50 kHz signal for 0.125 milliseconds followed by a 40 kHz signal for 0.125 milliseconds. This FSK signal of 40 and 50 kHz drives the gate of a MOSFET MB3. The drain of the MOSFET MB3 in FIG. 20 is connected to the die ground and the source of the MOSFET MB3 is connected through resistor RB1 to the pad P2 on the die. This, due to the presence of the power supply voltage VDD in the die, causes the potential at P2 to oscillate at the 40 to 50 kHz frequency, and this oscillation is sensed at the plate 28 in the exciter and signal conditioner unit 12.

The power supply for die 100 is illustrated in FIG. 20. The excitation or interrogation signal at 400 kHz emanating from the electric-field source plate 28 results in an oscillating electric field occurring across the pads P1 and P2 of the die 100. MOSFET's MB1 and MB2 are alternately turned on by the polarity reversals across the pads P1 and P2. When MB1 is conductive, diode DB2 is reverse-biased, diode DB1 is forward-biased and charge flows into capacitor CB1. Similarly, when MBI is conductive diode DB1 is reverse-biased, and diode DB2 is conductive so that charge again flows into the capacitor CB1. Thus, the voltage VDD is obtained to supply the other circuit components on the die 100.

The circuitry of FIG. 20 includes a clock generator including inverters LB1 through LB5. These provide the clock signal CIN and the inverted clock signal CINB. These clock signals are applied to the circuitry illustrated in FIG. 21, which produces the 4 kHz clock signal CK4K and the 8 KHz clock and inverted clock signals CK8K and CKB8K. This is accomplished with devices UC1 to UC11. Signal CK4K is applied to the modulo 8 counter shown in FIG. 22. It produces the column decode signals CD1 through CD6 supplied to the circuitry of FIG. 23 as previously described and provides, through the modulo 6 counter, the RD1 through RD5 signals also supplied to the ROM circuitry of FIG. 23.

Figure 18:
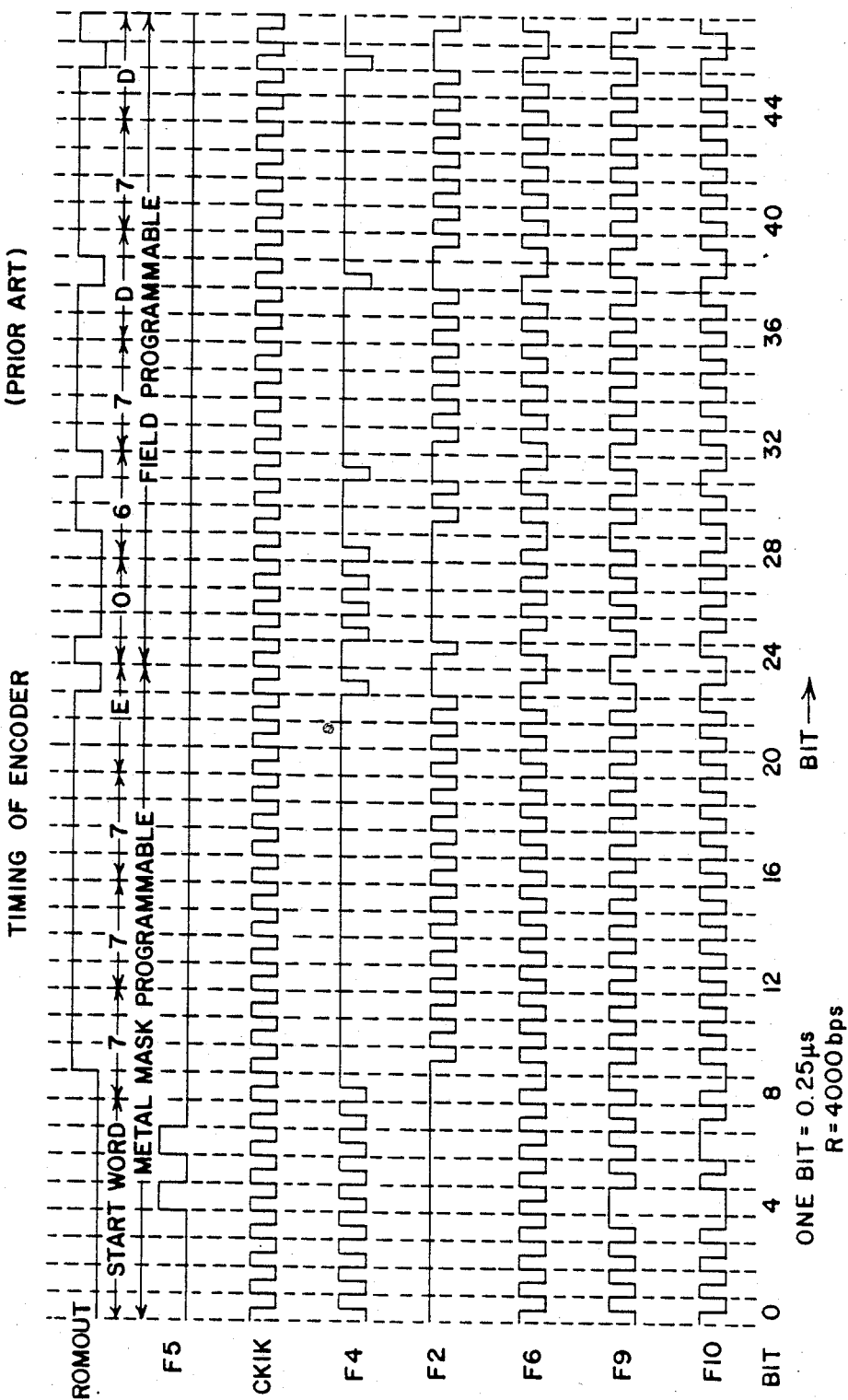
FIG. 18 illustrates the timing of signals of the encoder in the integrated circuit of FIG. 15.
Figure 24:
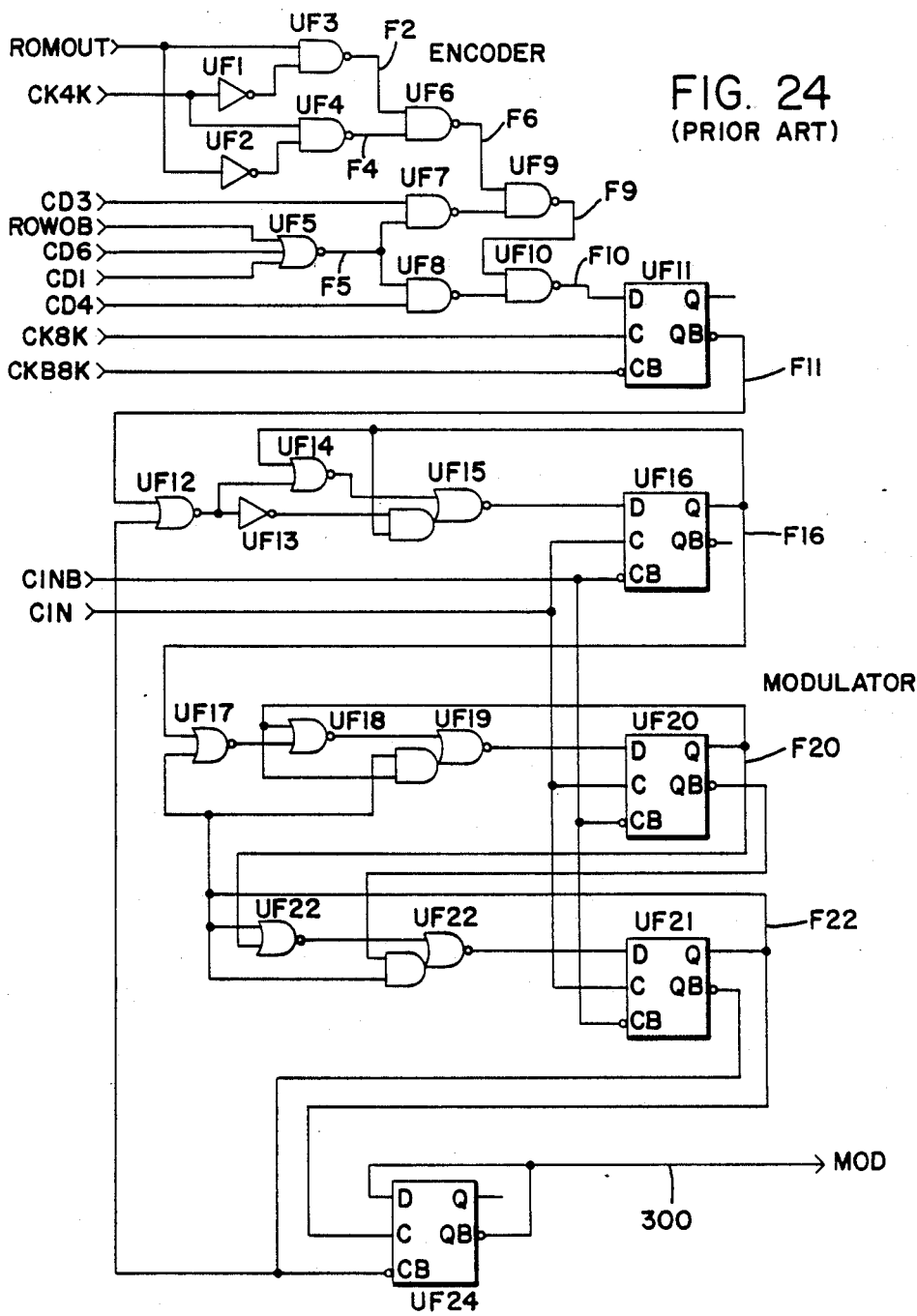
FIG. 24 is a schematic diagram of the encoder and modulator circuitry of the integrated circuit of FIG. 15.

The modulator circuitry is shown in detail in FIG. 24. Inputs to this circuit include the ROMOUT and ROWOB signals from the 48-bit ROM circuit of FIG. 23. Inputs further include various clock signals and column decode signals as shown. The output 300 of the modulator circuit in FIG. 20 is supplied to the MOSFET MB3 gate, as is shown in FIG. 20. The modulator functions in the manner described above and is consistent with the modulator operation disclosed in the Milheiser patent. FIG. 18 illustrates the timing of the encoder, and FIG. 19 provides sample timing for the modulator (data bit periods 27 through 31 of the 48 bit periods for data from the ROM are illustrated).

In FIG. 18, the 48 bit periods are shown along the bottom of the drawing. One bit equals 0.25 milliseconds at a bit-rate R of 4,000 bits per second (bps). From the ROMOUT signal, it may be seen that the start word occupies bit periods zero through seven and the remaining metal mask programmable bits are included in bit periods 8 through 23. Data bits 24 through 47 are those that are programmable after integrated circuit fabrication. The signals F5, F4, F2, F6, F9, F10, F11, F16, F20 and F23 illustrated in FIGS. 18 and 19 appear on the correspondingly identified conductors in the portion of the integrated-circuit schematic diagram shown in FIG. 24.

Figure 19:
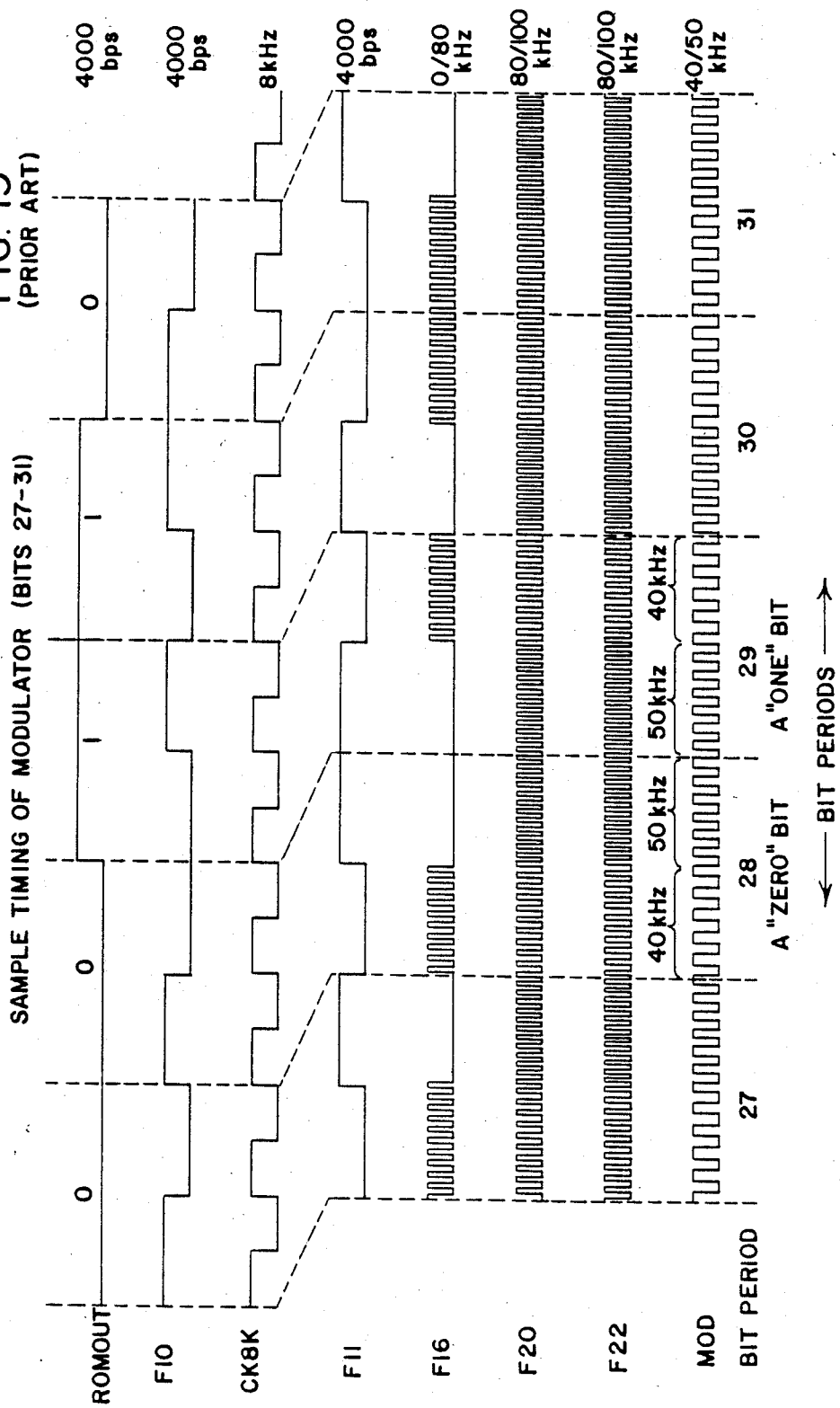
FIG. 19 illustrates signals related to sample timing of the modulator in the integrated circuit of FIG. 15.

The ROMOUT signal from the ROM is displayed as the first waveform in FIG. 19. During bit periods 27 and 28, the ROMOUT bits are zeros, are ones during bit periods 29 and 30, and a zero during bit period 31. Thus, the MOD signal applied to the MOSFET MB3 (FIG. 20) is shown as the last waveform in FIG. 19 and represents the FSK signal that controls transistor MB3 causing the voltage across pads P1 and P2 of the integrated-circuit die 100 to vary between the 40 and 50 kHz frequencies. As may be seen in the bottom of FIG. 19, a "zero" bit in bit period 28 is a transition from a 40 kHz frequency of the MOD signal to a 50 kHz signal, and the "one" bit in bit period 29 is a transition from the 50 kHz frequency to the 40 kHz frequency.

The actual transmission of the 48 bits of data from the transponder requires 12 milliseconds (0.25 milliseconds for each bit). Since the first eight of these bits are a start word, the remaining 40 bits contain identification data unique to the particular transponder and the pneumatic tire with which it is associated.

The demodulator and display unit 14 receives the amplified analog FSK modulated signal from the signal conditioner circuitry in unit 12 and processes the data into a 40-bit string. Individual bits may be detected and entered into a shift register one-by-one. These then may be displayed on the unit 14 in hexadecimal or other format. The 40 bits may be five eight-bit words, one bit of each word being a parity bit as previously noted. The manner in which these words are used to identify the pneumatic tire numerically depends upon the degree of verification desired and the maximum number of individual identifications desired. Even with the one bit of parity for each of the five words, there remains 35 bits of data that can be used for tire identification. This would allow a maximum of 34.4 billion unique identifications. If all forty bits in the five eight-bit words were to be used, a total of over one trillion unique identifications would be possible.

The integrated circuit transponder is capable of transmitting an FSK signal at a frequency of 40 or 50 kHz, depending upon the FSK modulation, in response to a 400 kHz interrogation signal emanating as electric field from a source or plate to which a 400 kHz voltage is applied. The voltage level with respect to ground must be sufficient to supply the power required by the power supply built into the integrated circuit transponder, such as is schematically illustrated in FIG. 20. However, the position of the electric field source plate 28 relative to the pneumatic tire 22 containing the transponder can be of some importance. More importantly, the arrangement of the transponder and its first and second electrodes relative to a steel component in the tire 22 is critical to it having across such electrodes, an oscillating voltage sufficient to cause transmission of the transponder's identification code. After sufficient power has been received, the integrated circuit is capable of serial transmission of the multibit binary identification code using frequency-shift-keying at frequencies reduced from that of the interrogation signal, which also is used as the source of a clock signal. The 400 kHz frequency is not mandatory but is convenient under FCC R/F band allocations in effect.

The general theory of operation of the integrated circuit transponder in the pneumatic tire 22 has been described particularly in relation to FIGS. 6 through 11. This operational theory may be summarized as follows:

An integrated circuit transponder will have maximum sensitivity to an applied electric field when oriented such that first and second electrodes, connected to power supply pads on the transponder integrated circuit, are at different equipotential lines with the maximum gradient between them. Maximum sensitivity occurs when the surface of the first electrode is located in proximity (average spacing close) to a metal component and the opposite or second electrode is far from the same component, provided of course that the electric field is properly oriented. In a pneumatic tire, this is particularly important because the steel-reinforced plies and tensile members in the beads of the tire form equipotential surfaces or elements to which electric field lines must be perpendicular. This means that the maximum gradients between transponder electrodes occur when one of the electrodes is near the steel-reinforced component of the tire and the other electrode is away from it.

The transponder of FIGS. 7 through 9 has plate electrodes, one of which can be positioned parallel with the steel reinforcement in a tire component. In such case, the spacing of such electrode surface from the component should be minimized. The electric field from the source will be perpendicular to the steel in the tire component and to the adjacent plate electrode in the transponder. The second plate electrode advantageously is spaced a comparatively large distance from the first.

If the distance from the field source plate 28 to ground potential is, for example, one meter, and if the source potential is 500 volts at 400 kHz, then the average electric field intensity between the plate and ground is 500 volts per meter or five volts per centimeter. Locating the transponder 24' with this field perpendicular to its plate electrodes should be sufficient to energize the transponder's power supply and thereby result in data transmission. If not, the field strength can be increased as necessary for the application.

Of course, the location of the transponder within the tire must be selected such that it does not interfere with the tire's durability during manufacture and in service. Also, the transponder must be able to survive the manufacturing process, including the temperatures encountered during the vulcanization of the tire's elastomeric components.

Based upon the foregoing description of the invention.

What is claimed is:

1. In combination, a pneumatic tire and an integrated circuit transponder located within the structure of the tire, the pneumatic tire having spaced beads including annular tensile members of wound or cabled steel wire, the tire having a plurality of plies at least one of which is a continuous ply extending between the annular tensile member, ends of the continuous play being turned axially and radially outwardly about the annular tensile members, the transponder having separate first and second electrodes and being able to transmit an electrical signal after an oscillating electric field of sufficient intensity is applied between the first and second electrodes of the transponder, the average spacing of the surface of the first electrode of the transponder from the steel wire in a component of the tire selected from the group consisting of the plies and the annular tensile members being substantially less than the average spacing of the surface of the second electrode of the transponder from the steel wire in such component ply or annular tensile member, the transponder within the tire structure being capable of transmitting the electrical signal in response to an oscillating electric field emanating from a source spaced from the tire and located radially away from the tread surface, and the transponder being capable of transmitting the electrical signal from the tire both prior to and after its vulcanization.

2. A pneumatic tire and transponder combination as in claim 1, wherein the component of the tire is the annular tensile member.

3. A pneumatic tire and transponder combination as in claim 1, wherein the component of the tire is a ply extending continuously between the annular tensile members and is reinforced with steel cord.

4. A pneumatic tire and transponder combination as in claim 1, wherein the component is a belt or breaker ply reinforced with steel cord.

5. A pneumatic tire and transponder combination as in claim 1, wherein the first and second electrodes of the transponder comprise first and second plates spaced from and parallel to one another, the integrated circuit being located between the plates, the plates and integrated circuit being located within the structure of the tire with the first plate positioned closer to the component than the second plate, the plates being parallel with the wire in the component.

6. A pneumatic tire and transponder combination as in claim 1, wherein the integrated circuit includes spaced contact pads, each of the first and second electrodes including conductors extending from the respective contact pads on the integrated circuit, one of the conductors extending toward the steel wire of the component and the other extending away from such steel wire.

7. A pneumatic tire and transponder combination as in claim 2, wherein the integrated circuit includes spaced contact pads, each of the first and second electrodes including conductors extending from the respective contact pads on the integrated circuit, one of the conductors extending toward the steel wire of the component and the other extending away from such steel wire.

8. A pneumatic tire and transponder combination as in claim 3, wherein the integrated circuit includes spaced contact pads, each of the first and second electrodes including conductors extending from the respective contact pads on the integrated circuit, one of the conductors extending toward the steel wire of the component and the other extending away from such steel wire.

9. A pneumatic tire and transponder combination as in claim 4, wherein the integrated circuit includes spaced contact pads, each of the first and second electrodes including conductors extending from the respective contact pads on the integrated circuit, one of the conductors extending toward the steel wire of the component and the other extending away from such steel wire.

10. A pneumatic tire and transponder combination as in claim 5, wherein the component of the tire is a ply extending continuously between the annular tensile members and having wire cord as its reinforcement material.

11. A pneumatic tire and transponder combination as in claim 9, wherein at least a portion of the surface area of the first electrode is positioned between the ply reinforced with steel cord and the wire of the annular tensile member in one of the beads.

12. A pneumatic tire and transponder combination as in claim 8, wherein at least a portion of the surface area of the first conductor is located on the radially outer side of the ply reinforced with steel cord and between the ply's main body and the ply's turn-up portion, the second conductor of the transponder extending radially outwardly from the turn-up portion of such ply.

13. A pneumatic tire and transponder as in claim 12, wherein the second conductor also extends axially away from the main body of the ply.

14. A pneumatic tire and transponder combination as in claim 9, wherein the first conductor is located between the radially outer side of the ply extending between the annular tensile members and the radially inner side of the belt or breaker ply.

15. A pneumatic tire and transponder combination as in claim 10, wherein the tire has an apex or apexes positioned radially outwardly of the annular tensile member of one of the ply's beads, the plates and integrated circuit of the transponder being located within the apex or apexes.

16. A pneumatic tire and transponder as in claim 14, wherein the second conductor of the transponder extends parallel with the cords of the ply and away from the lateral edge of the belt or breaker ply reinforced with steel cord.

17. A pneumatic tire and transponder combination as in claim 6, wherein the second conductor has substantially greater surface area than the first conductor.

18. A pneumatic tire and transponder combination as in claim 6, wherein the tire has two apexes positioned radially, outwardly of the annular tensile member of one of the ply's beads, the transponder being positioned between the two apexes.

19. A pneumatic tire and transponder combination as in claim 1, wherein of the ply of the tire extending between the annular tensile members is reinforced with steel cord and wherein the tire has one or more belts or breaker plies reinforced with steel cord.

20. A pneumatic tire and transponder combination as in claim 19, wherein the tire is a radial ply tire.

21. A pneumatic tire and transponder combination as in claim 20, wherein the tire has an apex or apexes, the transponder being located within such apex or apexes.

22. A pneumatic tire and transponder combination as in claim 21, wherein the transponder includes a pair of parallel plates, the integrated circuit being positioned between the parallel plates and the surfaces of the plates being parallel with the annular tensile member associated with the apex or apexes in which the transponder is located.

23. A pneumatic tire and transponder combination as in claim 21, wherein the first and second electrodes of the transponder comprise first and second plates spaced from and parallel to one another, the integrated circuit being located between the plates, the plates and integrated circuit being located within the apex or apexes with the first plate being positioned closer than the second plate to the steel cords of the ply extending between the annular tensile members.

24. A pneumatic tire and transponder combination as in claim 5, wherein the component of the tire is one of the annular tensile members and wherein the transponder and the transponder's first and second plate electrodes are embedded in a polyether urethane elastomeric material chemically reacted from a mixture of liquids.

25. A pneumatic tire and transponder combination as in claim 10, wherein the transponder and the transponder's first and second plate electrodes are embedded in a polyether urethane elastomeric material chemically reacted from a mixture of liquids.

* * * * *